(12) United States Patent
Shimamura et al.

(10) Patent No.: US 9,319,162 B2
(45) Date of Patent: Apr. 19, 2016

(54) SIGNAL PROCESSOR AND COMMUNICATION DEVICE

(71) Applicant: Spansion LLC, Sunnyvale, CA (US)

(72) Inventors: Akira Shimamura, Yokohama (JP); Koichi Mita, Yokohama (JP); Takashi Arai, Yokohama (JP); Hideshi Fujishima, Sagamihara (JP); Akira Endo, Sendai (JP)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/085,013

(22) Filed: Nov. 20, 2013

(65) Prior Publication Data

US 2014/0153589 A1    Jun. 5, 2014

Related U.S. Application Data

(63) Continuation of application No. 12/769,143, filed on Apr. 28, 2010, now Pat. No. 8,605,756, which is a continuation of application No. PCT/JP2007/071430, filed on Nov. 2, 2007.

(51) Int. Cl.
*H04J 3/06* (2006.01)
*H04L 29/06* (2006.01)
*H04L 12/40* (2006.01)

(52) U.S. Cl.
CPC .............. *H04J 3/06* (2013.01); *H04L 12/40006* (2013.01); *H04L 12/40032* (2013.01); *H04L 69/14* (2013.01); *H04L 2012/40241* (2013.01)

(58) Field of Classification Search
CPC ............. H04L 69/14; H04L 2012/6459; H04J 3/0652; H04J 2203/0085; H04N 2201/3261
See application file for complete search history.

(56) References Cited

U.S. PATENT DOCUMENTS 5,218,680 A * 6/1993 Farrell et al. .................. 709/215
6,782,066 B1 * 8/2004 Nicholas et al. .............. 375/368
(Continued)

FOREIGN PATENT DOCUMENTS

JP    1-136435    5/1989
JP    9-18455     1/1997
(Continued)

OTHER PUBLICATIONS

Naohiko Murakami, et al., "A Static Scheduling Method for Distributed Automotive Control System," IEICE Technical Report, vol. 10, No. 738, Mar. 11, 2005, 7 pages.
(Continued)

*Primary Examiner* — Raj Jain

(57) ABSTRACT

A signal processor includes a period detection section which detects that a period is currently used for communication of a frame; a pattern detection section which detects, from the received signal, a first signal pattern by which the end of communication of the frame is recognized; and an output processing section which outputs the received signal to a controller; configured to instruct, upon detection of the first signal pattern in the period being currently used for communication of a frame, the controller to halt startup of communication action of the next frame, until the period being currently used for communication of a frame comes to the end, to thereby reduce an event such that frames are transmitted from a plurality of communication devices simultaneously, and to thereby allow the communication action for the next frame to proceed correctly.

17 Claims, 17 Drawing Sheets

(56) References Cited

U.S. PATENT DOCUMENTS

| | | | |
|---|---|---|---|
| 7,038,800 B2* | 5/2006 | Ono et al. | 358/1.15 |
| 7,298,759 B2 | 11/2007 | Park et al. | |
| 2003/0200306 A1 | 10/2003 | Park et al. | |
| 2004/0081079 A1 | 4/2004 | Forest et al. | |
| 2004/0090962 A1* | 5/2004 | Forest et al. | 370/392 |
| 2005/0141565 A1 | 6/2005 | Forest et al. | |
| 2006/0214815 A1* | 9/2006 | Komatsu | 340/956 |

FOREIGN PATENT DOCUMENTS

| | | |
|---|---|---|
| JP | 2003-318911 | 11/2003 |
| JP | 2005-175614 | 6/2005 |
| JP | 2005-295132 | 10/2005 |

OTHER PUBLICATIONS

International Search Report for PCT/JP2007/071430, mailed on Dec. 4, 2007.

Extended European Search Report mailed Feb. 19, 2013 for corresponding European Patent Application No. 07831164.4.

USPTO Notice of Allowance for U.S. Appl. No. 12/769,143 dated Jul. 25, 2013; 8 pages.

Written Opinion of the International Searching Authority for International Application No. PCT/JP2007/071430 dated Jun. 10, 2010; 5 pages.

European Office Action for European Application No. 07831164.4 dated Mar. 5, 2015; 9 pages.

* cited by examiner

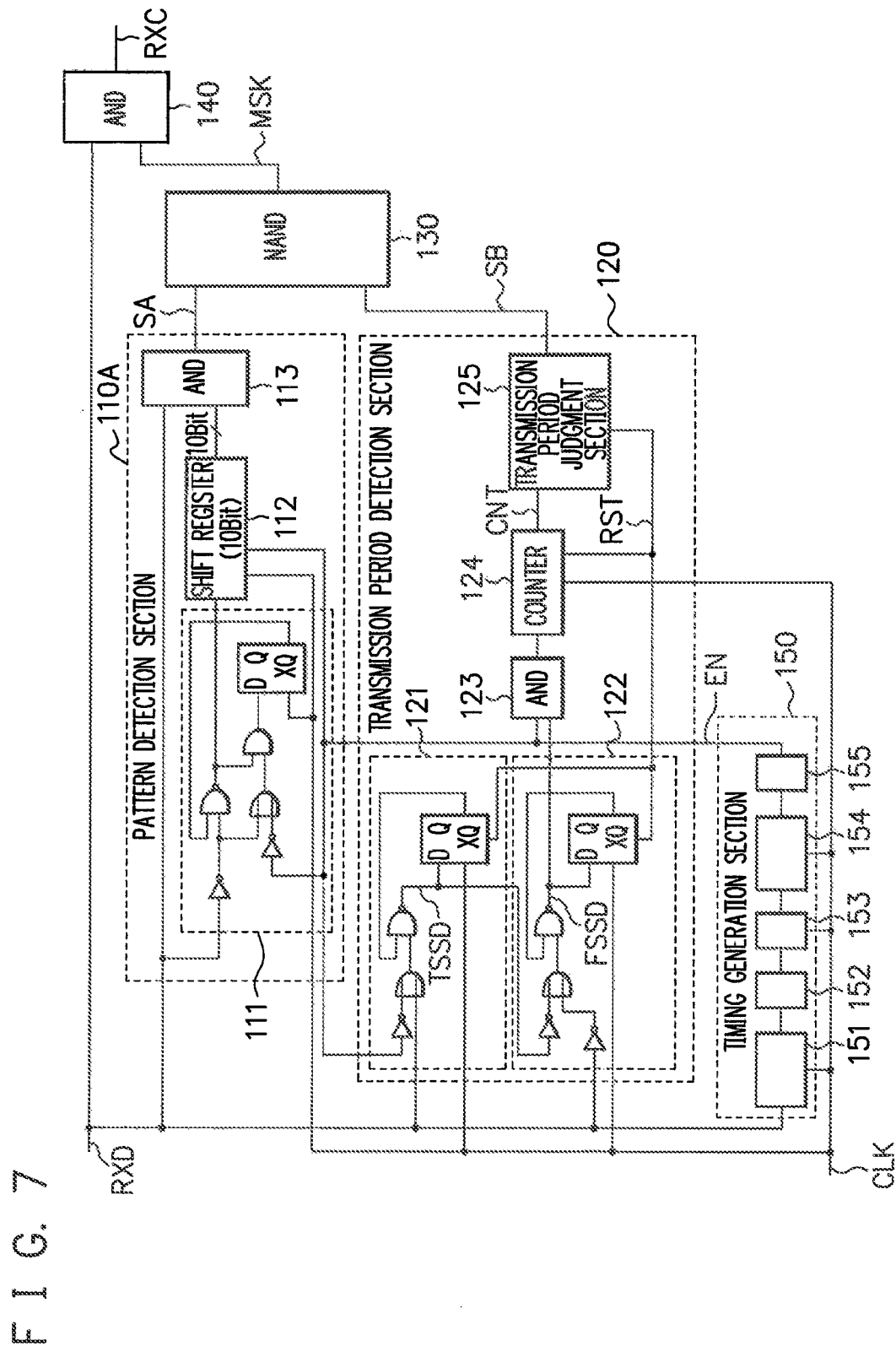
F I G. 7

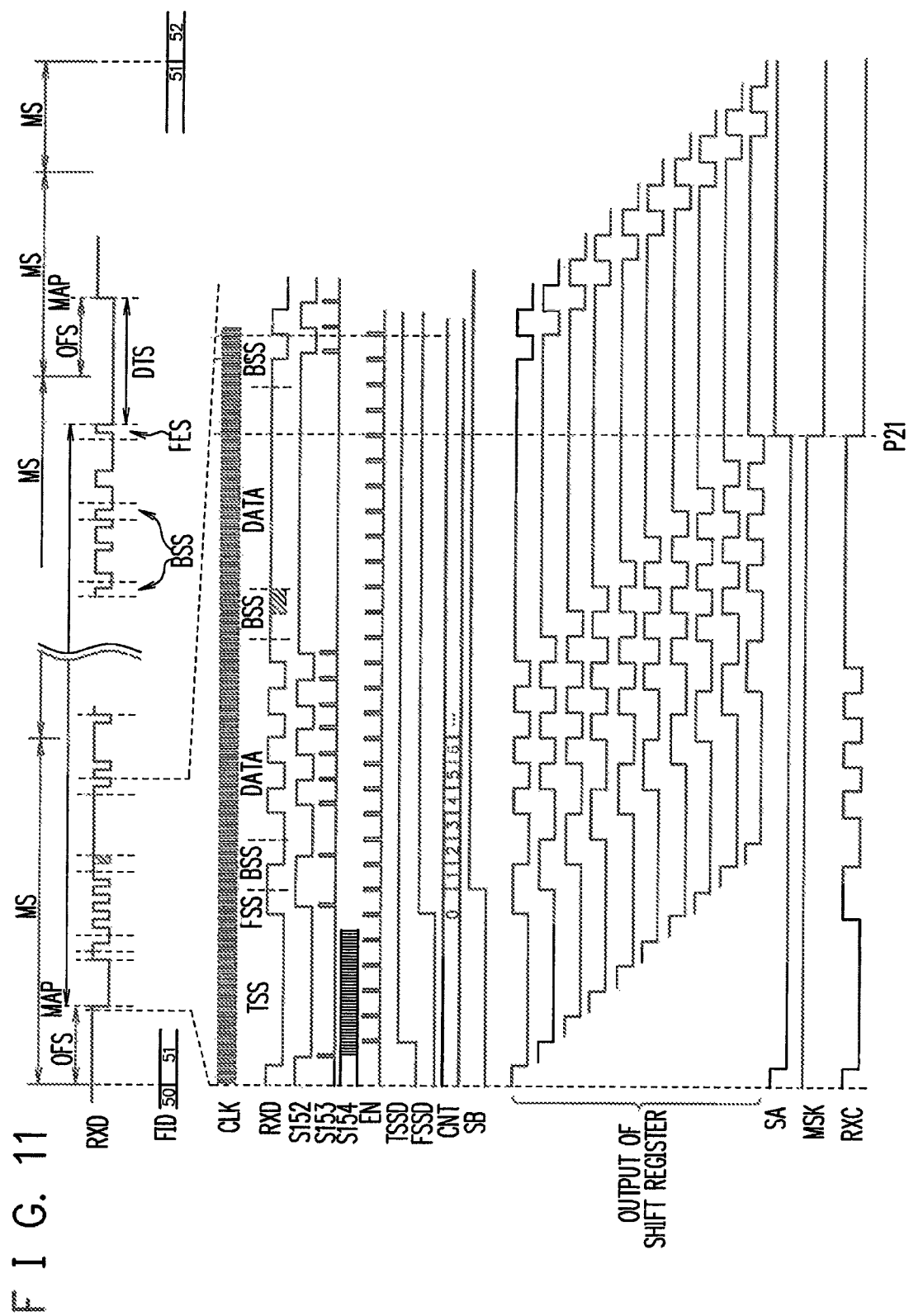
F I G. 11

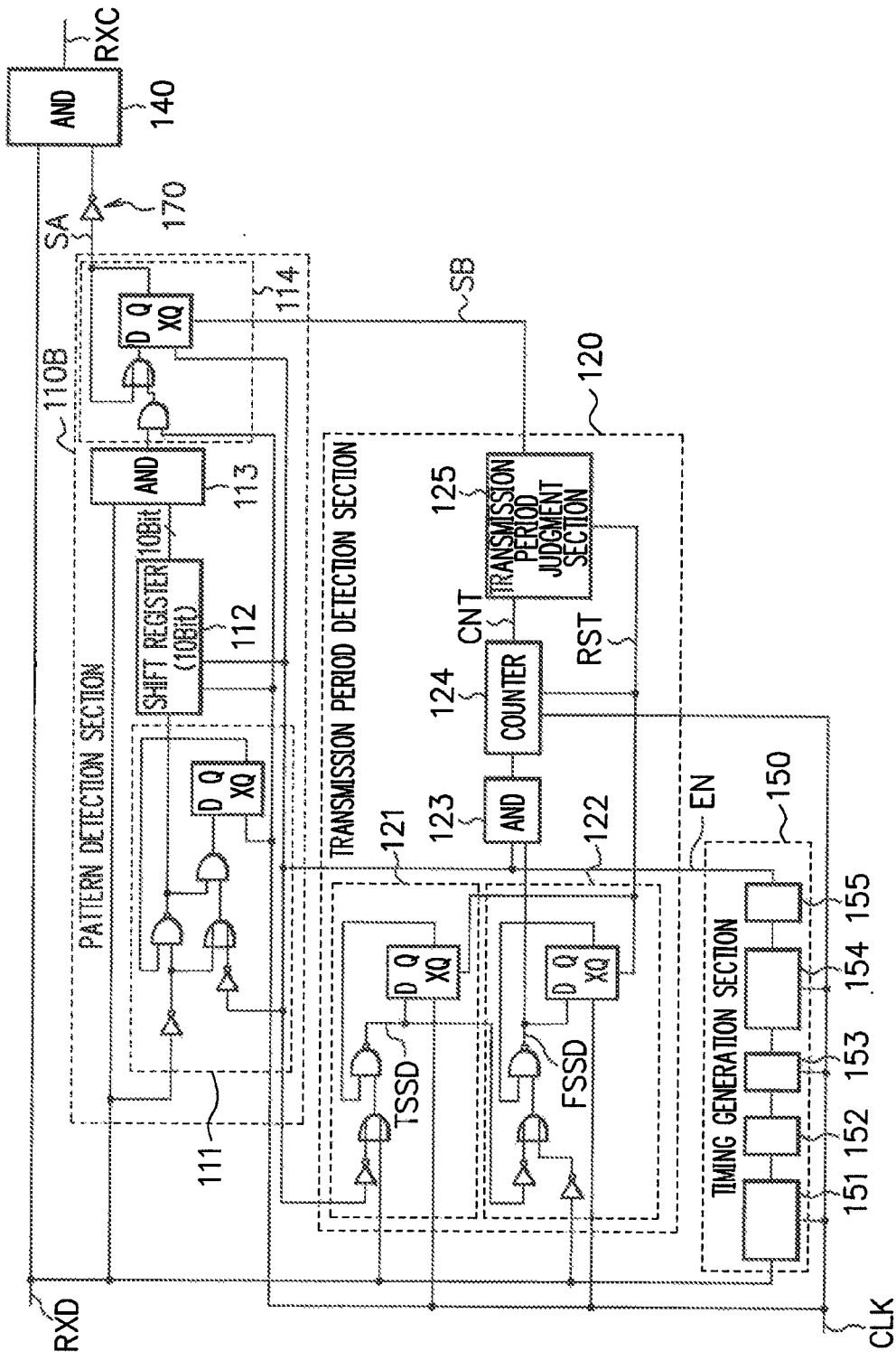
F I G. 13

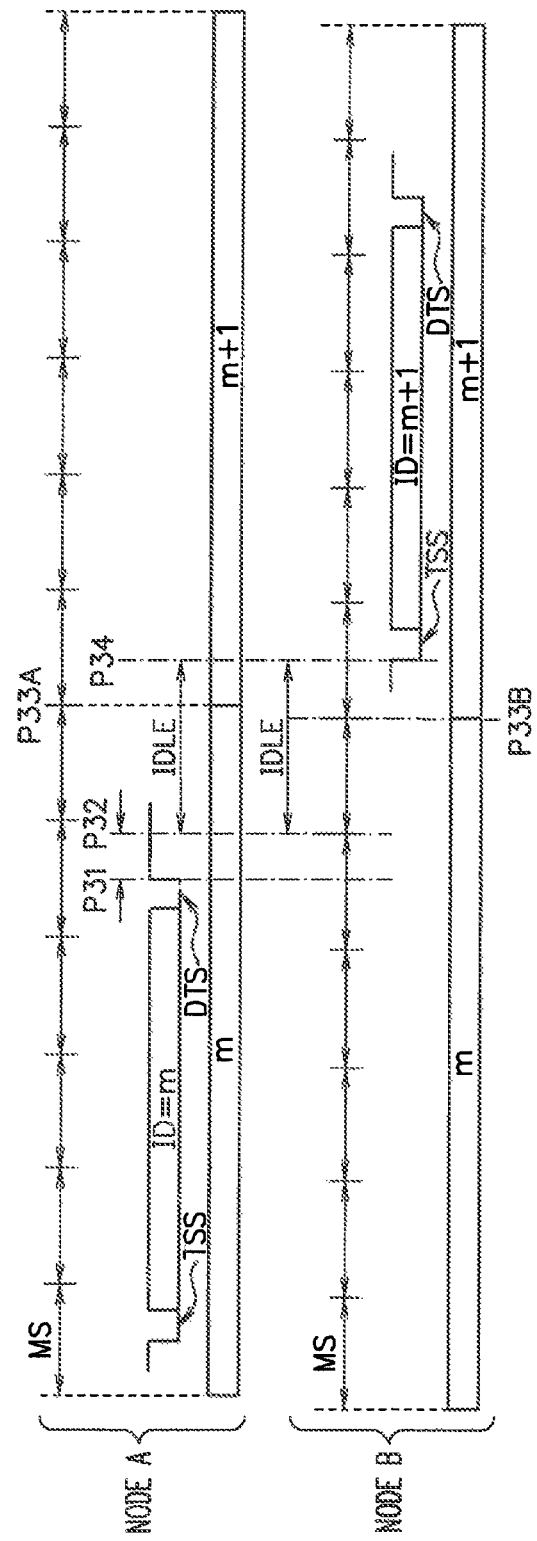

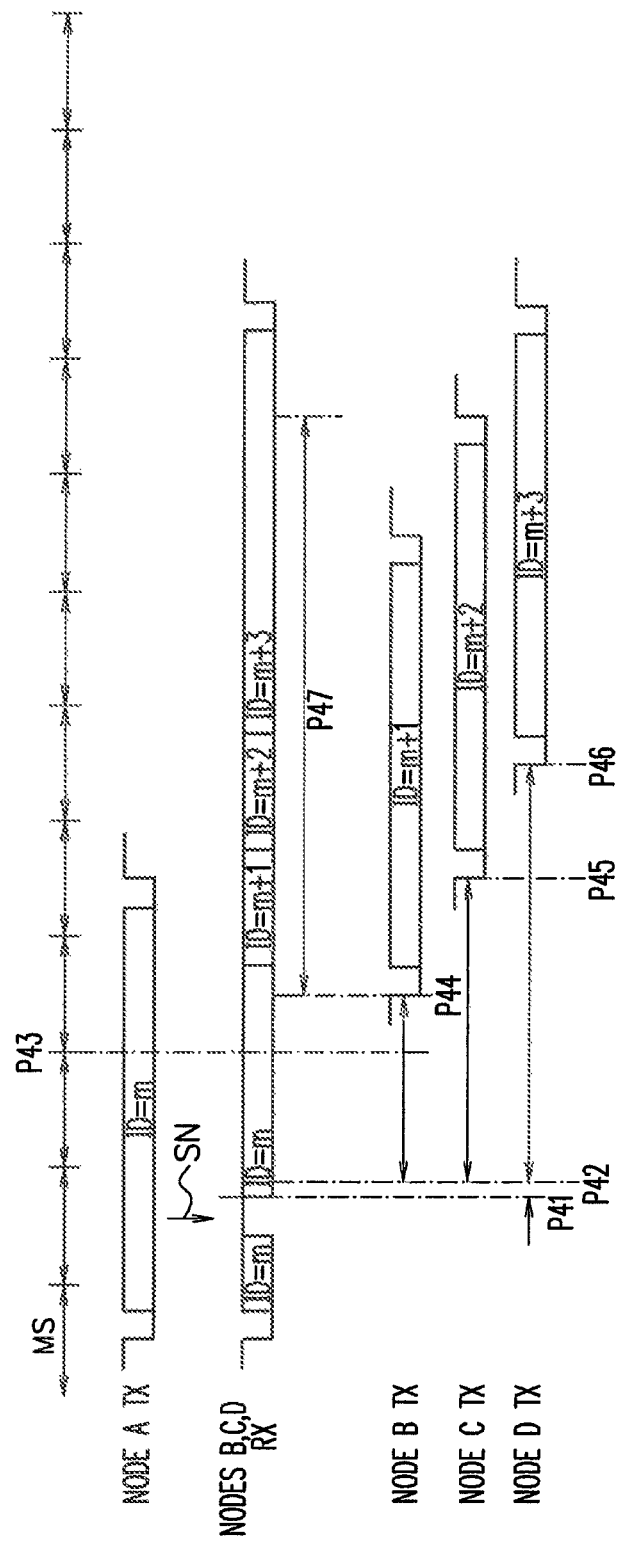

SIGNAL PROCESSOR AND COMMUNICATION DEVICE

CROSS REFERENCE TO RELATED APPLICATIONS

This application is a continuation of U.S. patent application Ser. No. 12/769,143, filed on Apr. 28, 2010, the entire contents of which are incorporated herein by reference. U.S. patent application Ser. No. 12/769,143, is a continuation of International Application No. PCT/JP2007/071430, with an international filing date of Nov. 2, 2007, which designated the United States of America, the entire contents of which are also incorporated herein by reference.

FIELD

The present embodiment relates to a signal processor and a communication device.

BACKGROUND

With advances of electronification and multi-functionalization of various automotive modules, automotive control system has increasingly been electronified. In place of a conventionally-known network communication system relevant to the automotive control system, using a communication protocol such as CAN, FlexRay protocol communication has been attracting a good deal of attention in view of its high failure-proof performance and increase in transmission rate.

FlexRay protocol is used for communication based on the time-division multiple access (TDMA) system. Both of periodical data communication which transmits data in a periodical manner, and non-periodical data communication such as CAN, which activates communication depending on needs, are supported by the FlexRay protocol, thereby enabling flexible and efficient use of a communication network. Duplication (redundant configuration) of a signal line (communication channel) is also supported by the FlexRay protocol, so as to improve the failure-proof performance.

In the FlexRay protocol, a state of communication is periodically repeated according to a communication cycle CM_CYC, as illustrated in FIG. 14. The communication cycle CM_CYC is composed of a static segment ST_SEG, a dynamic segment DY_SEG, a symbol window SW, and a network idle time NIT.

The static segment ST_SEG represents a period allocated to frame communication based on the static time-division multiple access system. The periodical data communication as described in the above takes place in the static segment ST_SEG. In the static segment ST_SEG, each node transmits a communication frame (static_frame) in an allocated static slot STS. Each static slot STS is a period allocated to transmission of a static frame, and has a fixed length. Also the length of the static frame is fixed. The static frame includes a synchronization frame used for establishing synchronization with the communication cycle CM_CYC.

The dynamic segment DY_SEG represents a period dynamically allocated to frame communication based on a unit of mini-slot MS. The non-periodical data communication described in the above proceeds in the dynamic segment DY_SEG. In the dynamic segment DY_SEG, a communication frame (dynamic frame), which has an ID corresponded to the value of the slot counter, is given a right of transmission, as illustrated in FIG. 14. Upon completion of transmission of a frame, the slot counter is incremented, and the right of transmission shifts to a frame which has an ID corresponded to the incremented value. If there is no frame having an ID corresponded to the value of the slot counter, the slot counter is incremented while being timed by the mini-slot MS as illustrated in the drawing, and the right of transmission of the frame shifts to the frame having the next ID.

The slot counter is used for scheduling the communication within a period of communication cycle, and is owned by the individual nodes. Each node establishes synchronization of the slot counter with the communication cycle at the head of the communication cycle, and thereafter increments the slot counter using a clock of its own. In this way, synchronization among the slot counters of the individual nodes is established. The ID is an identifier of the frame, and all frames in the network are assigned certain IDs. Also the frame ID transmitted by each node is certain thereto.

The symbol window SW represents a period used for maintenance, and the network idle time NIT represents a period for adjusting the periodicity relevant to the communication cycle.

FIG. 15 is a chart illustrating a timing of transmission relevant to the dynamic frame. In FIG. 15, TSS (transmission start sequence) represents a signal pattern which indicates the start of transmission of frame, composed of a 3 to 15-bit low level ("L" level) pattern. FSS (frame start sequence) represents a signal pattern which indicates start of frame, composed of a 1-bit high level ("H" level) pattern. BSS (byte start sequence) represents a signal pattern which indicates start of data (8 bits), composed of a 2-bit "HL" pattern. FES (frame end sequence) represents a signal pattern which indicates end of frame, composed of a 2-bit "LH" pattern. DTS (dynamic trailing sequence) represents a signal pattern which indicate end of transmission of frame, composed of an "L" level pattern having one or more bits. DTS follows FES, and continues up to a mini-slot action point MAP of the next mini-slot. MS.

As described in the above, in the dynamic segment, the frame communication takes place based on the dynamic allocation using the mini-slot MS as a unit, so that the timing relevant to the dynamic frame is set on the basis of mini-slot MS. The FlexRay protocol is, however, designed to perform no communication event at around a point of change of the mini-slot MS, considering that the individual nodes operate conforming to the clocks of their own. For this reason, the communication event starts at the mini-slot action point MAP reached after the elapse of an offset time OFS from the point of change of the mini-slot MS.

The communication event herein means the start of transmission of frame, and end of transmission of frame. Since the point of time when the transmission of dynamic frame completes varies depending on volume of data to be transmitted, so that the slot counters of the individual nodes are allowed to equally vary, by placing DTS so as to keep the signal level at "L" level up to the mini-slot action point MAP in the next mini-slot MS.

In the dynamic segment, upon recognition of the end of communication of a frame currently in process, the next node starts to transmit the dynamic frame. Since a normal dynamic frame does not output nine (data and the first bit of succeeding BSS) or more consecutive bits of "H" level, so that the end of communication of the frame currently in process may be recognized by occurrence of a consecutive 11-bit or longer period where the "H" level persists. In other words, the communication terminates when eleven or more consecutive bits of "H" level are detected.

For example, as illustrated in FIG. 16, when node A on the transmitting side terminates transmission of dynamic frame (ID=m) corresponded to a value "m" of slot counter (P31), node A fixes the communication line at the high impedance state. At this time, node B on the receiving side recognizes the state as "H" level.

When "H" level is detected over a period of eleven consecutive bits, nodes A, B cause transition to the idle (IDLE) state (P32). The detection is independently participated by each node. In the IDLE state, a frame is awaited, and reception of frame starts upon recognition of the "L" level pattern.

If the length of time corresponding to the mini-slot MS elapses in the IDLE state, each node increments value of the slot counter by one, at the point of change of mini-slot MS (P33A, P33B). In this way, a dynamic frame (ID=m+1) corresponded to value (m+1) of the slot counter is authorized for transmission, and node B starts to transmit the dynamic frame (ID=m+1) (P34).

It is now assumed that, as illustrated in FIG. 17, nodes B, C and D on the receiving side are contaminated with a noise typically detected as eleven or more consecutive bits of "H" level (SN), in the period when node A on the transmitting side is transmitting the dynamic frame (ID=m) corresponded to the value m of the slot counter. Note that, in FIG. 17, TX represents a transmitted signal, and RX represents a received signal.

In this case, nodes B, C and D cause transition to the IDLE state, despite node A is transmitting the frame, because eleven consecutive bits of "H" level were detected (P41). As a consequence, nodes B, C and D terminate reception of the frame being transmitted by node A, and are brought into wait state for frame reception.

On the other hand, node A keeps on transmitting the current frame to the end. Accordingly, nodes B, C and D detect the "L" level pattern in the frame transmitted by node A, and erroneously recognize that the next frame was received (P42). As a consequence, a frame error (decoding error) generates is judged to start from the head portion of the erroneously recognized frame, and nodes B, C and D cause transition to the IDLE wait state. In the IDLE wait state, the start of frame reception is not detected.

Detection of the start of frame reception restarts when the nodes are brought into the IDLE state, but the eleven consecutive bits of "H" level is not detected since node A keeps on transmitting the residual data of the frame, so that the IDLE wait state is maintained. Since the slot counter is freely running in the IDLE wait state, so that nodes B, C and D increment the value of the slot counter by 1, at the point of change of the mini-slot MS (P43). In this way, the dynamic frame (ID=m+1) corresponded to the value (m+1) of the slot counter is authorized for transmission, and node B then starts to transmit the dynamic frame (ID=m+1) (P44).

Similarly, upon increment of the value of the slot counter by 1 at the point of change of the mini-slot MS, node C starts to transmit the dynamic frame (ID=m+2) (P45), and node D starts to transmit the dynamic frame (ID=m+3) (P46).

In this state (for example, during the period P47 illustrated in FIG. 17), what is occurring on the network is simultaneously transmission of dynamic frames from a plurality of nodes, and consequent destruction of transmission waveform caused by collision of the frames.

Once such situation occur, the individual nodes try to establish communication respectively conforming to incorrect timing, until the timing is updated (synchronization of the slot counter) at the head of the next communication cycle. In other words, the conventional problem has been such that correct communication is kept disabled until the next communication cycle is started, if eleven or more consecutive bits of "H" level are detected by the node on the receiving side due to noise contamination during transmission of the dynamic frame from the node on the transmitting side.

Patent Document 1 below describes a device and a method of generating time slot used in a home network system making use of the home PNA protocol, and discloses a technique of generating time slot using carrier sensing signal CS. For example, the document discloses control of generation of time slot, by judging presence of error in the carrier sensing signal CS.

Patent Document 2 below describes a frame synchronization device and an optical transmitter-receiver mounting the frame synchronization device. The document discloses a technique of including erroneous synchronization of the frame synchronization device, when the frame timed differently from a regular reception period is received, by determining whether the synchronization be established according to that frame, or according to the previous timing of reception.

Patent Document 1: Japanese Laid-Open Patent Publication No. 2003-318911

Patent Document 2: Japanese Laid-Open Patent Publication No. 2005-175614

SUMMARY

According to an aspect of the embodiments, a signal processor includes a period detection section which detects that a period is currently used for communication of a frame, a pattern detection section which detects, from the received signal, a first signal pattern by which the end of communication of the frame is recognized, and an output processing section which outputs the received signal, configured to instruct, upon detection of the first signal pattern in the period being currently used for communication of a frame, the controller to halt startup of communication action of the next frame, until the period being currently used for communication of a frame comes to the end, to thereby reduce an event such that frames are transmitted from a plurality of communication devices simultaneously, and to thereby allow the communication action for the next frame to proceed correctly.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWING(S)

FIG. 7 is a drawing illustrating another exemplary circuit configuration of the signal processing section of the first embodiment;

FIG. 11 is a timing chart illustrating operations of the signal processing section illustrated in FIG. 10;

FIG. 13 is a drawing illustrating another exemplary circuit configuration of the signal processing section of the second embodiment;

FIG. 16 is a drawing illustrating communication processing (normal state) in a dynamic segment; and FIG. 17 is a drawing illustrating communication processing (for the case where eleven or more consecutive bits of "H" level were detected during communication) in the dynamic segment.

DESCRIPTION OF EMBODIMENT(S)

Embodiments will be explained below, referring to the attached drawings.

The description below deals with an exemplary case where the present embodiment was adopted to the FlexRay protocol communication. The FlexRay protocol is used for communication based on the time-division multiple access (TDMA) system as described in the above, and supports both of the periodical data communication which transmits data using the static slot in a periodical manner, and the non-periodical data communication based on dynamic allocation using the mini-slot as a unit, which activates communication depending on needs. The present embodiment is, however, not limited thereto, and is adoptable to a communication system which is proceeded based on allocated unit communication periods, in which each communication device recognizes the end of communication of a frame based on a received signal, and then starts a communication action of the next frame.

First Embodiment

A first embodiment will be explained.

Figure 1:
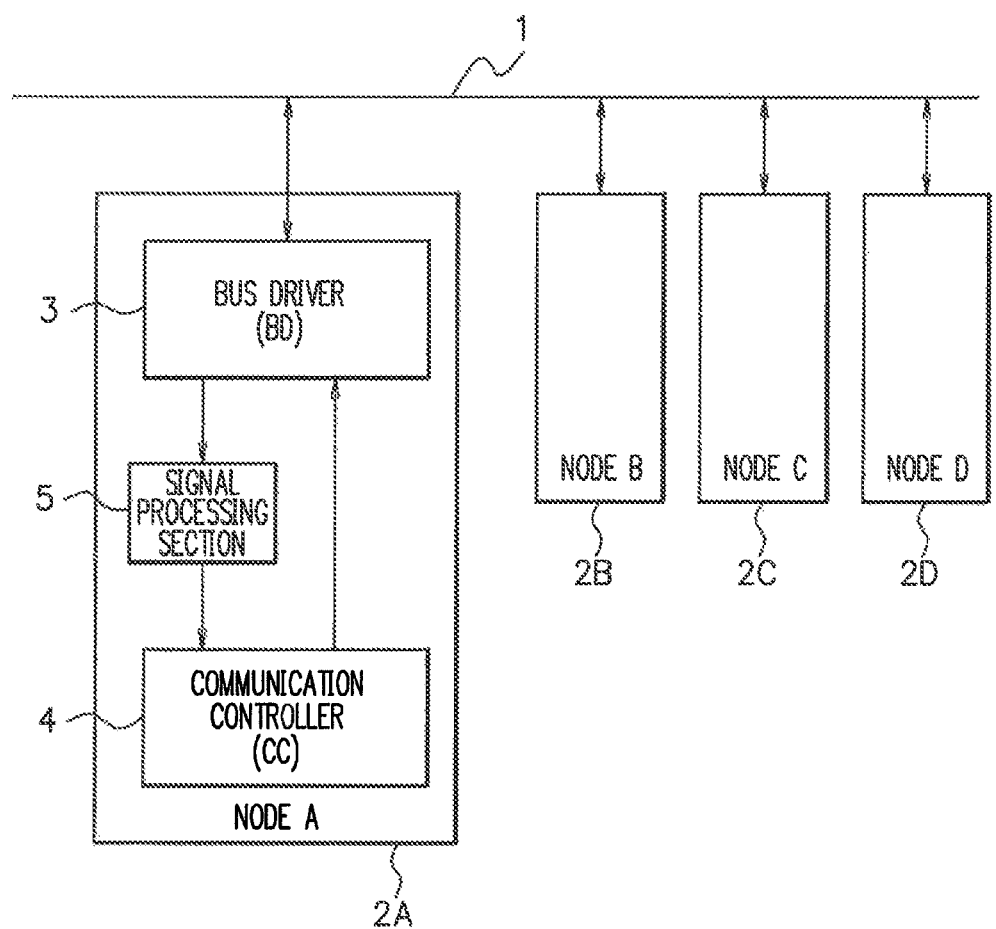
FIG. 1 is a drawing illustrating an exemplary configuration of a communication system according to an present embodiment.

FIG. 1 is a drawing illustrating an exemplary configuration a communication system of the first embodiment.

The communication system (FlexRay network system) of this embodiment includes a bus 1, and a plurality of nodes 2 coupled thereto in a communicatable manner. Note that FIG. 1 illustrates four nodes, that are node A (2A), node B (2B), node C (2C) and node D (2D) merely for exemplary purposes, allowing instead an arbitrary number of nodes to be coupled. Also a topology is not limited to the bus-type network, allowing instead a star-type network, and combinations of these types.

Each of nodes 2A to 2D has a bus driver (BD) 3, a communication controller (CC) 4, and a signal processing section 5.

The bus driver 3 transmits and receives signals through the bus 1, to and from other nodes. The bus driver 3 typically converts FlexRay analog signals into digital signals. The communication controller 4 controls the FlexRay communication protocol. For example, the communication controller 4 controls signals transmitted and received by the bus driver 3, to and from other nodes.

The signal processing section 5 is provided between the bus driver 3 and the communication controller 4. The signal processing section 5 accepts signals (received signals) from other nodes received by the bus driver 3, appropriately processes the received signals, and then outputs them to the communication controller 4. The signal processing section 5 herein is configured to process the frame (dynamic frame) to be communicated in the dynamic segment.

Figure 2:
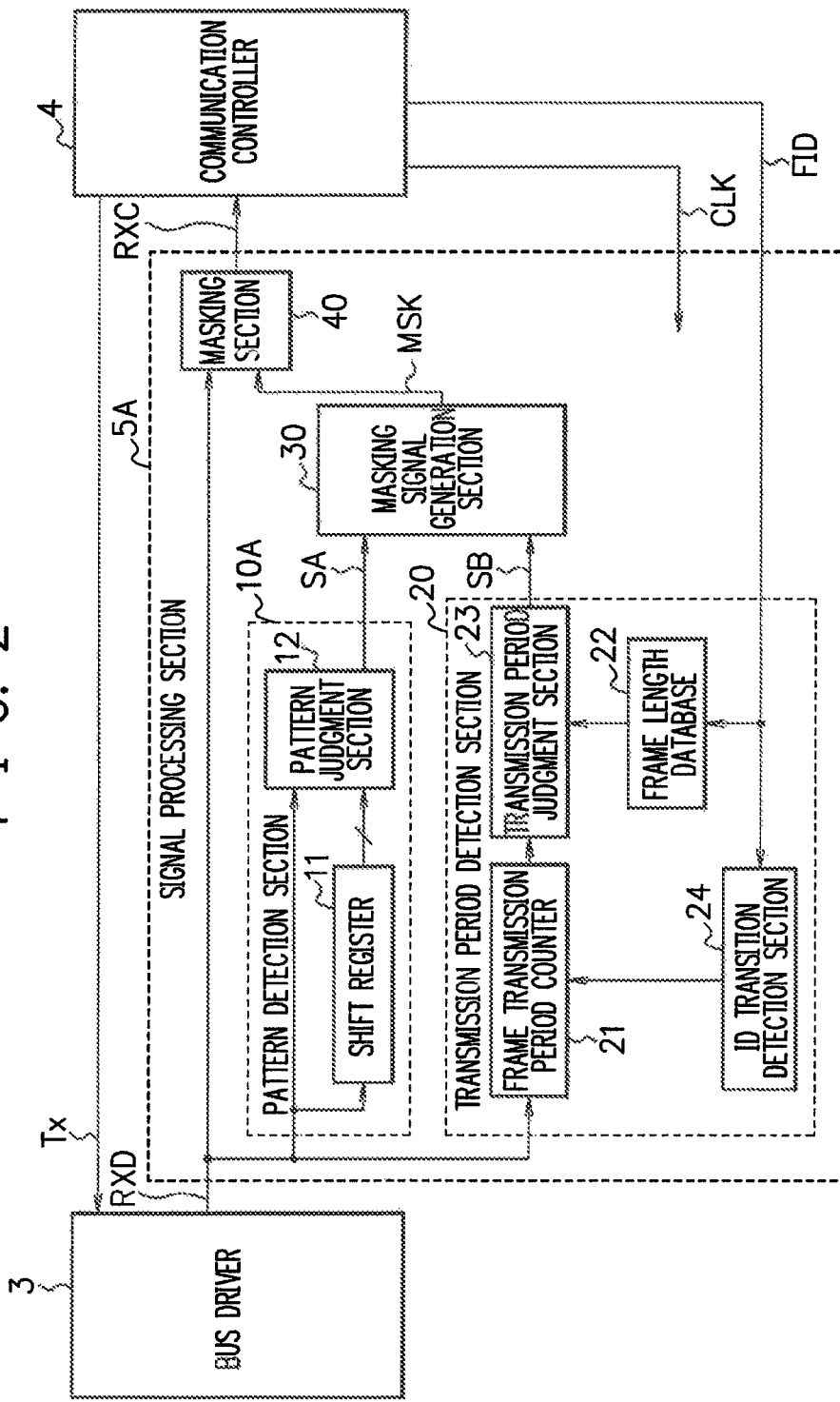
FIG. 2 is a drawing illustrating an exemplary configuration of a signal processing section of a first embodiment.

FIG. 2 is a block diagram illustrating an exemplary configuration of the signal processing section 5A of the first embodiment.

As described in the above, in the FlexRay protocol, the end of communication of the dynamic frame may be recognized by detecting occurrence of eleven or more consecutive bits of "H" level period, and communication action relevant to the next dynamic frame is then started. If eleven or more consecutive bits of "H" level occur during communication of the dynamic frame typically due to noise contamination of a node on the receiving side, the communication controller 4 of the node judges that the communication of the dynamic frame completed, and starts the communication action relevant to the next dynamic frame (wait for the next frame).

Since the action based on such judgment may affect the transmission timing of the next and further succeeding dynamic frames, so that, upon detection of eleven or more consecutive bits of "H" level during communication of the dynamic frame, the signal processing section 5A of the first embodiment masks the receive signal as "L" level so as to hide all of eleven or more consecutive bits of "H" level, and then outputs it to the communication controller 4. In this way, the dynamic frame currently in process (in the process of reception) might err, but the next and succeeding dynamic frames may be reduced from being incorrectly timed for transmission, and thereby the next dynamic frame may correctly be communicated.

The signal processing section 5A of the first embodiment has a pattern detection section 10A, a transmission period detection section 20, a masking signal generation section 30, and a masking section 40, and operates according to an operation clock CLK from the communication controller 4.

The pattern detection section 10A detects a first signal pattern (signal pattern composed of eleven consecutive bits of "H" level), by which the end of communication of the dynamic frame is recognized, from a received signal RXD accepted by the bus driver 3. The pattern detection section 10A has a shift register 11 and a pattern judgment section 12.

The shift register 11 in this embodiment is a 10-bit shift register which operates according to a certain sampling frequency, samples the received signal RXD input thereto, and shifts the sampled signal. The shift register 11 outputs all signals held therein to the pattern judgment section 12. The pattern judgment section 12 judges whether the signal pattern of the received signal RXD is the first signal pattern or not, based on the received signal RXD and the output of the shift register 11. The pattern judgment section 12 outputs a result of judgment in a form of signal SA.

The transmission period detection section 20 detects that a period is currently used for communication of the dynamic frame. In other words, the transmission period detection section 20 detects the end of communication for the case where the communication of the dynamic frame having been in process was normally completed. The transmission period detection section 20 has a frame transmission period counter, a frame length database 22, a transmission period judgment section 23, and an ID transition detection section 24.

The frame transmission period counter 21 counts received data volume summed up from the start of transmission of the dynamic frame, according to the communication protocol. The transmission period judgment section 23 compares the output (received data volume summed up from the head of the dynamic frame) from the frame transmission period counter 21, with the frame length of the dynamic frame supplied from the frame length database 22, and judges whether the period is currently used for communication of the dynamic frame. The transmission period judgment section 23 then outputs a result of judgment in a form of signal SB.

The frame length database 22 stores, on the frame basis, preliminarily-set frame length (also including bit length of BSS) of the dynamic frame. The frame length database 22 outputs the frame length of the dynamic frame, which corresponds to the frame ID (FID) from the communication controller 4, to the transmission period judgment section 23. Note that the frame length of the dynamic frame may be arbitrary on the specification basis, but may be determined depending on system configuration or the like in the process of system design, so that it is possible to preliminarily store the frame length in the frame length database 22. In addition, the frame length may appropriately be set depending on the system configuration or system specification, by making the frame length database 22 rewritable.

The ID transition detection section 24 detects transition of the frame ID (FID) supplied from the communication controller 4. Counter value of the frame transmission period counter 21 is initialized, when transition of the frame ID (FID) is detected by the ID transition detection section 24.

The masking signal generation section 30 generates and outputs a masking signal MSK, based on the signal SA from the pattern detection section 10A, and signal SE from the transmission period detection section 20. For example, when the signal SA indicates that the signal pattern of the received signal RXD matches the first signal pattern, and the signal SB indicates that the period is currently used for communication of the dynamic frame, the masking signal generation section 30 outputs the masking signal MSK so as to mask the eleventh and succeeding bit(s) in the first signal pattern.

The masking section 40 masks the received signal RXD from the bus driver 3, corresponding to the masking signal MSK from the masking signal generation section 30, and outputs it as a received signal RXC to the communication controller 4. More details, the masking section 40 masks the received signal RXD and outputs "L" level as the received signal RXC in the period during which the masking signal MSK is output from the masking signal generation section 30, and outputs the received signal RXD as the received signal RXC without modification in the residual period.

The masking signal generation section 30 and the masking section 40 correspond to the output processing section. Upon detection of the first signal pattern in the period being currently used for communication of the dynamic frame, they instruct the communication controller 4 to halt startup of communication action of the next frame, until the communication of the dynamic frame terminates.

Figure 3:
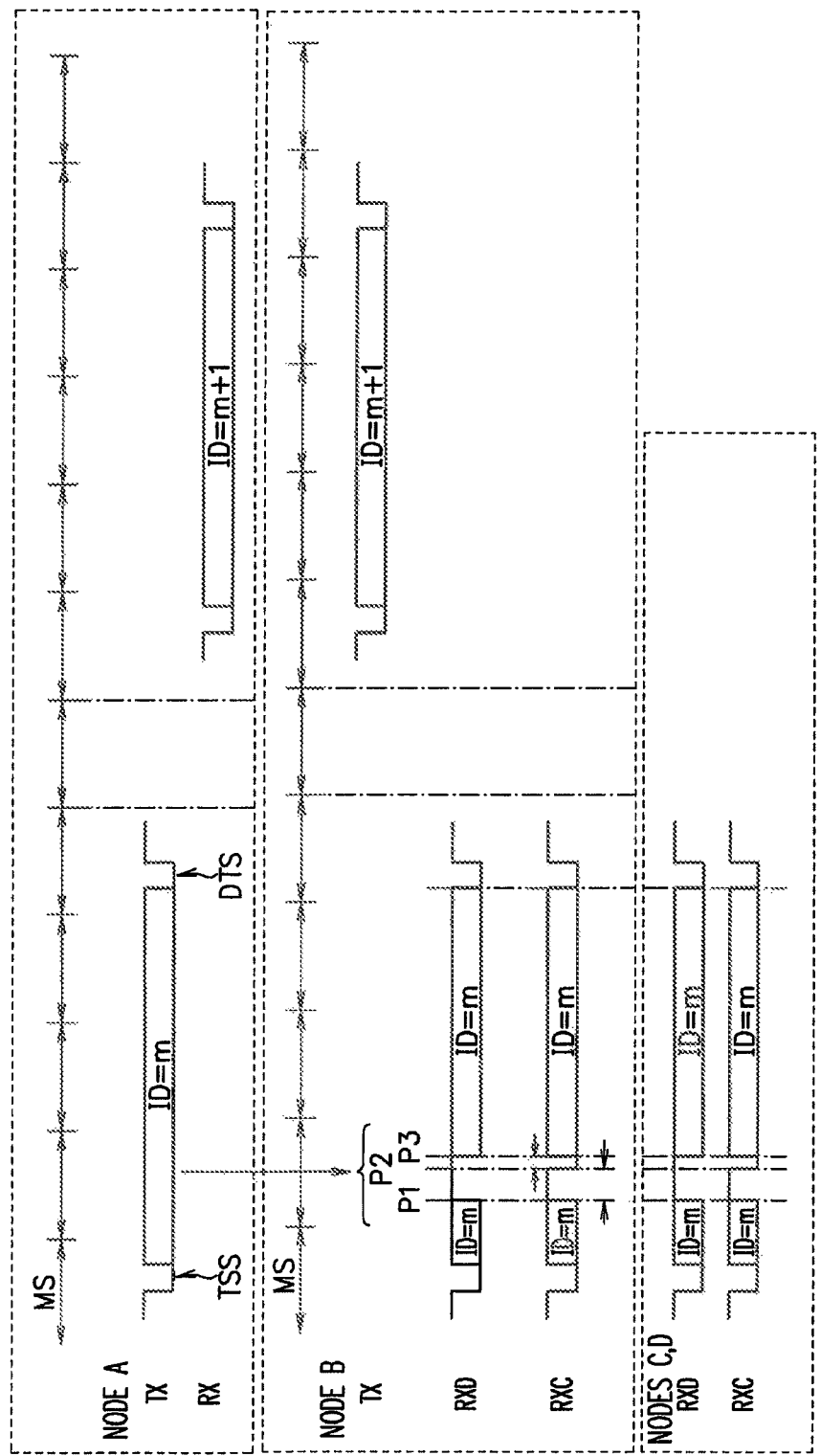
FIG. 3 is a drawing explaining operations of the signal processing section illustrated in FIG. 2.

According to the above-described configuration, as illustrated in FIG. 3, if eleven or more consecutive bits of "H" level generate in the received signal RXD due to noise contamination at nodes B, C and D on the receiving side, during transmission of the dynamic frame (ID=m) by node A, the signal pattern is detected by the pattern detection section 10A of the signal processing section SA at the nodes on the receiving side. On the other hand, the transmission period detection section 20 of the signal processing section 5A at the nodes on the receiving side detects that the period is currently used for communication of the dynamic frame (ID=m).

As a consequence, the masking signal generation section 30 outputs the masking signal MSK, so as to mask the eleventh and succeeding bit(s) of "H" level in the eleven or more consecutive bits of "H" level in the received signal RXD, to produce "L" level. Accordingly, the masking section 40 outputs the first to the 10th bits of "H" level ("H" level in the period between P1 and P2), out of eleven or more consecutive bits of "H" level in the received signal RXD, as the received signal RXC to the communication controller 4 without modification. On the other hand, the masking section 40 masks all "H" level on the eleventh and succeeding bit(s) ("H" level in the period between P2 and P3) to produce "L" level, and outputs them as the received signal RXC to the communication controller 4.

Accordingly, even if eleven or more consecutive bits of "H" level generate in the node on the receiving side during communication of the dynamic frame, the communication will not be judged as being completed, because the communication controller 4 will not have input of eleven or more consecutive bits of "H" level. As a consequence, the state of transition thereafter will not incorrectly be timed, and the communication action for the next dynamic frame (ID=m+1) correctly takes place.

Figure 4:
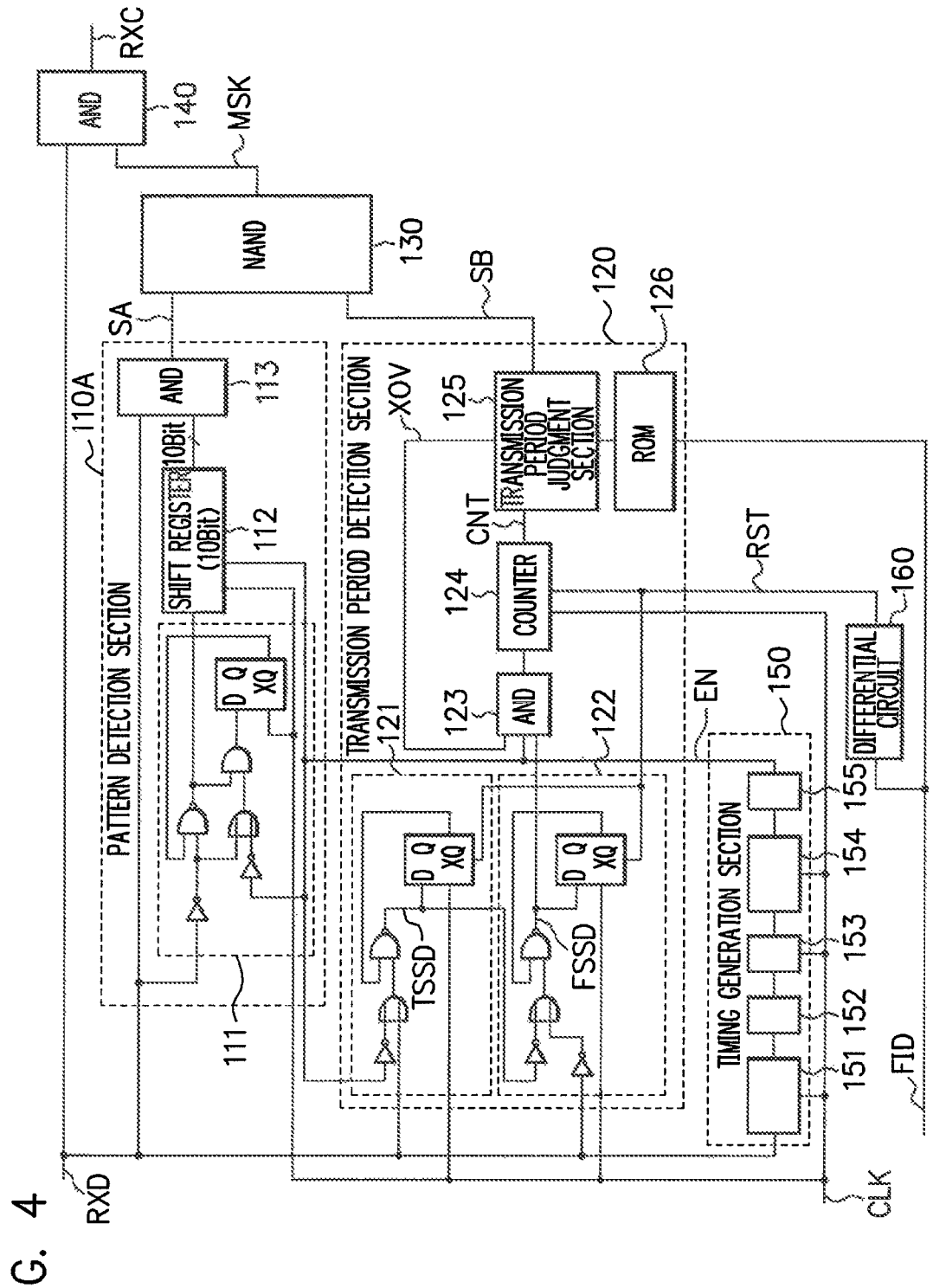
FIG. 4 is a drawing illustrating an exemplary circuit configuration of the signal processing section of the first embodiment.

FIG. 4 is a drawing illustrating an exemplary circuit configuration of the signal processing section 5A of the first embodiment. In FIG. 4, reference numeral 110A represents a pattern detection section, 120 represents a transmission period detection section 120, 130 represents a not-logical conjunction circuit (NAND circuit), 140 represents a logical conjunction circuit (AND circuit), 150 represents a timing generation section, and 160 represents a differential circuit.

The FlexRay protocol performs 8-clock oversampling per 1 bit. Using the operation clock CLK used for the oversampling, the timing generation section 150 extracts timing based on the received signal RXD, and generates operation timings (such as timing by which the received signal is recognized) of the individual circuits.

The timing generation section 150 has a 5-stage shift register 151, a majority circuit 152, a differential circuit 153, a counter 154, and an enable signal generation circuit 155. The 5-stage shift register 151, the differential circuit 153, and the counter 154 operate based on the operation clock CLK used for the oversampling.

The 5-stage shift register 151 performs oversampling of the received signal RXD, and sequentially shifts it. The majority circuit 152 decides the majority among five outputs from the 5-stage shift register 151, and outputs the result. The differential circuit 153 detects a point of change in the output from the majority circuit 152, and outputs the detected result.

The counter 154 is changed by 1 in the value in every period of the operation clock CLK, wherein the count ranges from 1 to 8. The counter 154 returns to the initial value, when the point of change in the output from the majority circuit 152 is detected by the differential circuit 153, and when over-flow occurs. The enable signal generation circuit 155 generates an enable signal EN as an operation timing signal, based on output of the counter 154. For example, the enable signal generation circuit 155 may activate the enable signal EN only in the period the output of the counter 154 is kept at a certain level (5, for example).

The pattern detection section 110A corresponds to the pattern detection section 10A illustrated in FIG. 2, and detects, from the received signal RXD, the first signal pattern which is composed of eleven consecutive bits of "H" level, by which the end of communication of the dynamic frame is recognized. The pattern detection section 110A has a masking circuit 111, a shift register 112, and an AND circuit 113.

The masking circuit 111 is provided so as to reduce malfunction in the initial state, such as power-on time. The masking circuit 111 has two inverters, an NAND circuit, a logical disjunction circuit (OR circuit), an AND circuit, and a flip-flop which operates according to the operation clock CLK.

An output XQ of the flip-flop and the received signal RXD inverted by a first inverter are input to the NAND circuit. The received signal RXD inverted by the first inverter and the enable signal EN inverted by the second inverter are input to the OR circuit. An output of the NAND circuit and an output of the OR circuit are input to the AND circuit, and an output of the AND circuit is input to the flip-flop.

The masking circuit 111 configured as described in the above outputs "L" level, irrespective of the received signal RXD, until both of the received signal RXD and the enable signal become "H" level. Once both of the received signal RXD and the enable signal became "H" level, the masking circuit 111 outputs the received signal RXD. Note that the masking circuit 111 is preferably provided, but is not essential for the purpose of obtaining the effects of this embodiment.

The shift register 112 corresponds to the shift register 11 illustrated in FIG. 2. The shift register 112 is a 10-bit shift register. The shift register 112 performs sampling of the received signal RXD (more details, output of the masking circuit 111) input thereto, and shifts the sampled signal.

The AND circuit 113 corresponds to the pattern judgment section 12 illustrated in FIG. 2. The AND circuit 113 accepts the received signal RXD (1 bit), and the output (10-bit) of the shift register 111, and then outputs a result of the conjunctive operation in a form of signal SA. For example, the AND circuit 113 sets the signal SA to "H" level when the received signal RXD and all of the outputs from the shift register 111 have "H" level, in other words, when the first signal pattern is detected, and sets the signal SA to "L" level in all other cases.

The transmission period detection section 120 corresponds to the transmission period detection section 20 illustrated in FIG. 2, and detects that the period is currently used for communication of the dynamic frame. The transmission period detection section 120 has a TSS detection circuit 121, an FSS detection circuit 122, an AND circuit 123, a counter 124, a transmission period judgment section 125, and a ROM 126.

The TSS detection circuit 121 detects a signal pattern TSS which indicates start of frame transmission. The TSS detection circuit 121 has an inverter, an OR circuit, an NAND circuit, and a flip-flop which operates based on the operation clock CLK, and is reset by a reset signal RST.

The received signal RXD, and the enable signal EN inverted by the inverter are input to the OR circuit. An output XQ of the flip-flop and an output of the OR circuit are input to the NAND circuit. An output of the NAND circuit is input to the flip-flop, and is output as a TSS detection signal TSSD.

According to the configuration described in the above, the TSS detection circuit 121 sets the TSS detection signal TSSD to "L" level, when the reset signal RST is input thereto (when the frame ID changes). Thereafter, the TSS detection circuit 121 sets the TSS detection signal TSSD to "H" level, when the first "L" level in the received signal RXD, in other words, the signal pattern TSS which indicates the start of frame transmission, is detected.

The FSS detection circuit 122 detects the signal pattern FSS which indicates start of frame. The FSS detection circuit 122 has two inverters, an OR circuit, an NAND circuit, and a flip-flop which operates based on the operation clock CLK, and is reset by the reset signal RST.

The received signal RXD and the TSS detection signal TSSD are respectively inverted by the inverters, and input to the OR circuit. An output XQ of the flip-flop and an output of the OR circuit are input to the NAND circuit. An output of the NAND circuit is input to the flip-flop, and is output as an FSS detection signal TSSD.

According to the configuration described in the above, the FSS detection circuit 122 sets the FSS detection signal FSSD to "L" level, when frame ID changes. Thereafter, the FSS detection circuit 122 sets the FSS detection signal FSSD to "H" level, upon detecting "H" level of the received signal RXD while keeping the TSS detection signal TSSD at "H" level, in other words, when the signal pattern FSS which indicates start of frame is detected.

The AND circuit 123 accepts input of the FSS detection signal FSSD, the enable signal EN, and a control signal XOV, and outputs a result of the operation to the counter 124. For example, the AND circuit 123 outputs the enable signal EN to the counter 124, when the FSS detection signal FSSD and the control signal XOV have "H" level, and outputs "L" level to the counter 124 irrespective of the enable signal EN, when at least either one of the FSS detection signal FSSD and the control signal XOV is set to "L" level.

The counter 124 counts the received data volume summed up from the start of the dynamic frame. The counter 124 counts data volume sampled from the received signal RXD, based on the "H" level output (corresponded to the enable signal EN) from the AND circuit 123 when the FSS detection signal FSSD and the control signal XOV are set to "H" level. The counter 124 is initialized by the reset signal RST.

The frame transmission period counter 21 illustrated in FIG. 2 is configured by the TSS detection circuit 121, the FSS detection circuit 122, the AND circuit 123, and the counter 124.

The transmission period judgment section 125 corresponds to the transmission period judgment section 23 illustrated in FIG. 2, and judges whether the period is currently used for communication of a dynamic frame or not. For example, the transmission period judgment section 125 compares a counter value CNT from the counter 124 and a set value supplied from the ROM 126, and outputs a result of comparison in a form of signal SB. The ROM 126 corresponds to the frame length database 22 illustrated in FIG. 2, and has a preliminarily-set value of frame length (also including bit length of BSS) of the dynamic frame.

The transmission period judgment section 125 outputs the signal SB set to "H" level if the counter value CNT is not larger than the set value (frame length) supplied from the ROM 126, and outputs the signal SB set to "L" level if the counter value CNT is larger than the set value supplied from the ROM 126. The transmission period judgment section 125 sets the control signal XOV to "L" level, if the counter value CNT reaches a maximum value countable by the counter 124.

The NAND circuit 130 corresponds to the masking signal generation section 30 illustrated in FIG. 2, accepts input of the signals SA and SB, and outputs a result of calculation in a form of masking signal MSK. The NAND circuit 130 sets the masking signal MSK to "L" level, when both of the signals SA and SB have "H" level, in other words, when the first signal pattern composed of eleven consecutive bits of "H" level is detected by the pattern detection section 110A, and when the transmission period detection section 120 detects that the period is currently used for communication of the dynamic frame. The masking signal is set to "H" level in all other cases.

The AND circuit 140 corresponds to the masking section 40 illustrated in FIG. 2, accepts inputs of the received signal RXD and the masking signal MSK, and outputs a result of calculation in a form of the received signal RXC. For example, the AND circuit 140 outputs the signal RXD as the received signal RXC without modification when the masking signal MSK is set to "H" level. When the masking signal MSK is set to "L" level, it masks the received signal RXD, and outputs "L" level as the received signal RXC.

The differential circuit 160 corresponds to the ID transition detection section 24 illustrated in FIG. 2. The differential circuit 160 accepts an input of frame ID (FID), and outputs the reset signal RST when the transition of frame ID is detected.

Figure 5:
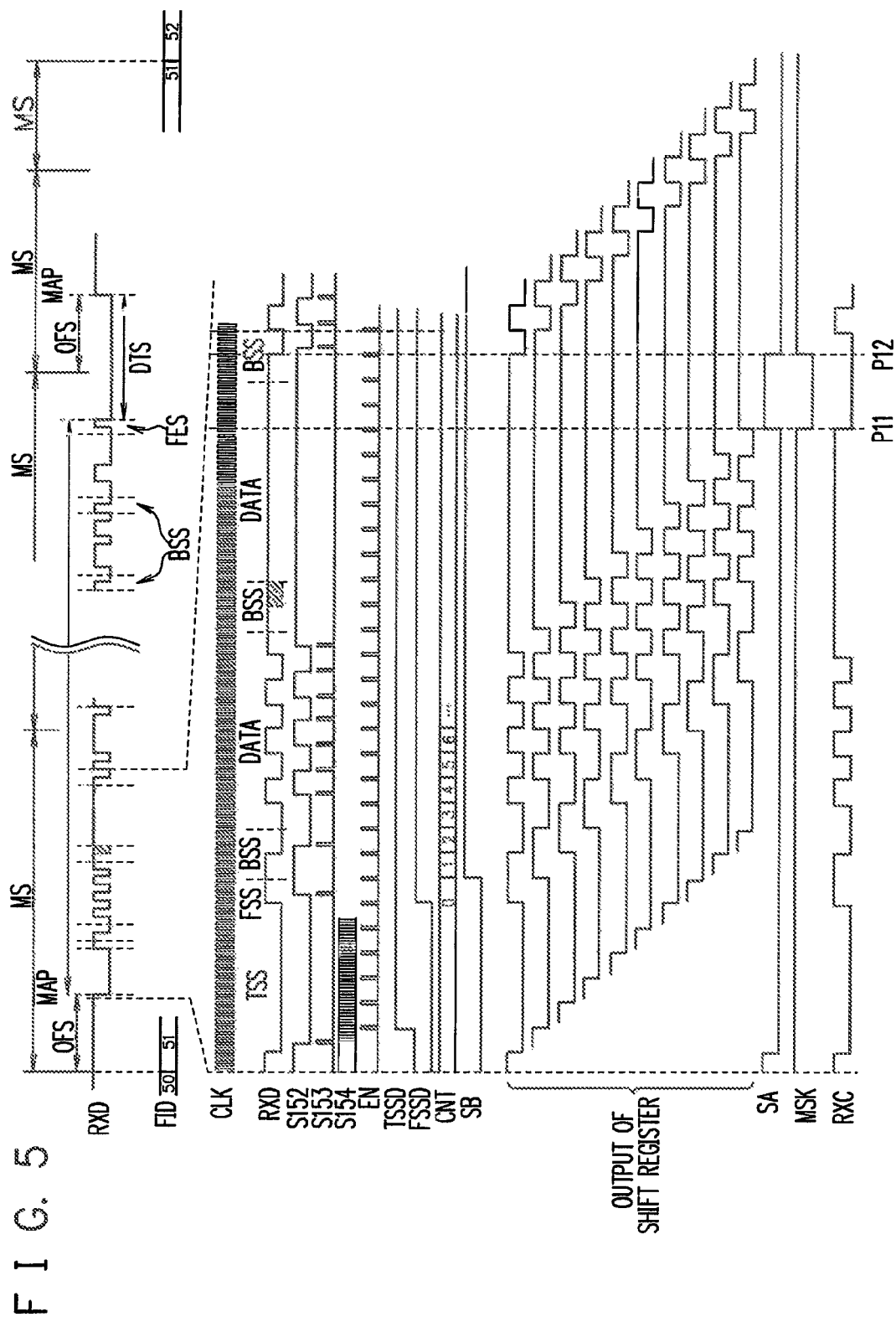
FIG. 5 is a timing chart illustrating operations of the signal processing section illustrated in FIG. 4.
Figure 6:
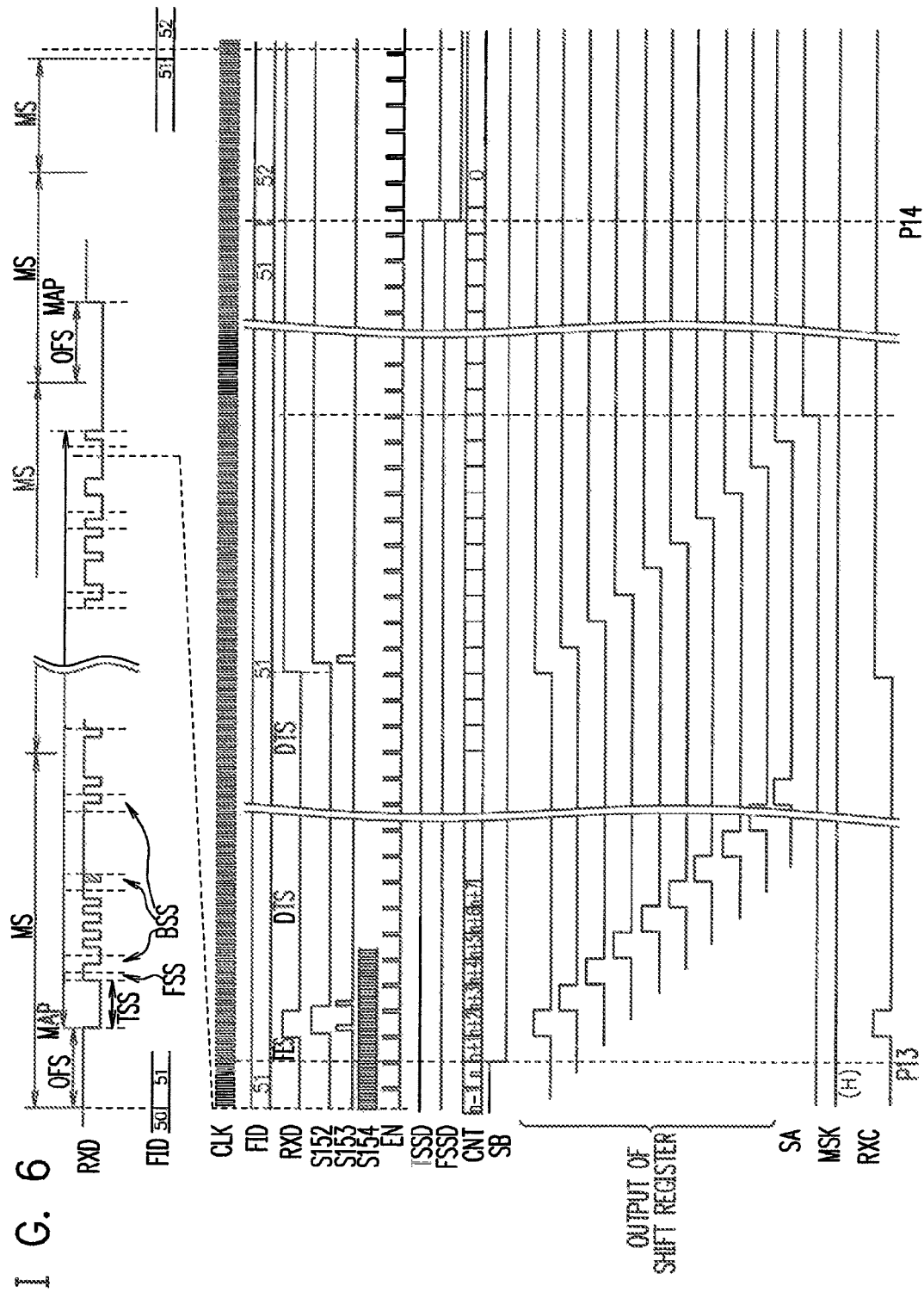
FIG. 6 is a timing chart illustrating operations of the signal processing section illustrated in FIG. 4.

FIG. 5 and FIG. 6 are timing charts illustrating the signal processing section illustrated in FIG. 4. FIG. 5 illustrates operations of the signal processing section, particularly those take place when the masking of the received signal RXD starts, and FIG. 6 illustrates operations of the signal processing section, particularly those take place when the communication of the dynamic frame terminates.

In FIG. 5 and FIG. 6, RXD, FID and CLK respectively represent the received signal, the frame ID, and the operation clock to be input to the signal processing section, and RXC represents a received signal output from the signal processing section. S152, S153, S154 and EN respectively represent outputs of the individual functional sections 152, 153, 154 and 155 in the timing generation section 150. TSSD, FSSD, CNT and SB respectively represent outputs of the individual functional sections 121, 122, 124 and 125 in the transmission period detection section 120. SA represents an output of the pattern detection section 110A, and MSK represents a masking signal which is an output of the NAND circuit 130.

As illustrated in FIG. 5, in the period in which the masking signal MSK is kept at "H" level, the received signal RXD is output as the received signal RXC without modification. In contrast, if the received signal RXD and all of the outputs of the shift register 112 have "H" level, in other words, if eleven consecutive bits of "H" level are detected and the signal SA is set to "H" level in the period of communication of the dynamic frame (period over which the signal SB is kept at "H" level), the masking signal MSK is set to "L" level (P11). As a consequence, the received signal RXD is masked by the masking signal MSK, and the received signal RXC is output while being set to "L" level irrespective of the received signal RXD.

Thereafter, the signal SA turns to "L" level, upon input of the received signal RXD set to "L" level (P12). In association therewith, the masking signal MSK turns to "H" level, and the received signal RXD is output as the received signal RXC.

On the other hand, as illustrated in FIG. 6, if the count value CNT output from the counter 124 is larger than the set value n (preliminarily-set frame length) at the end of the frame, the signal SB turns to "L" level (P13). The signal pattern DTS composed of "L" level pattern, which indicates the end of frame transmission, is input as the received signal RXD over a certain period, and the received signal RXD then turns "H" level. In this process, the received signal RXD may occasionally have eleven or more consecutive bits of "H" level, but the masking signal MSK is kept at "H" level, since the signal SB is kept at "L" level. Upon transition of the frame ID, the signals TSSD, FSSD and the counter value CNT are initialized, and the process advances to the communication action for the next frame (P14).

In the above-described first embodiment, the transmission period detection section detects whether the period is currently used for communication of the dynamic frame or not, by comparing the count value which indicates the received data volume, with the frame length preliminarily stored on the frame basis. Alternatively, a configuration illustrated in FIG. 7 may be acceptable if the dynamic frame has a fixed length.

FIG. 7 is a drawing illustrating another exemplary circuit configuration of the signal processing section 5A of the first embodiment. In FIG. 7, all constituents having functions identical to those of the constituents illustrated in FIG. 4 are given same reference numerals or symbols, and relevant explanations will not be repeated.

In the signal processing section illustrated in FIG. 7, the transmission period judgment section 125 in the transmission period detection section 120 does not externally acquire the set value (frame length), but internally has the value preliminarily set therein.

The transmission period judgment section 125 compares the counter value CNT supplied from the counter 124 with a first set value preliminarily-stored therein, and outputs a result of comparison as the signal SB. The transmission period judgment section 125 also compares the counter value CNT supplied from the counter 124 with a second set value preliminarily-stored therein, and outputs a result of comparison as the reset signal RST. The first set value herein represents the frame length, and the second set value represents a time (on the data length basis) from the start of the frame to the start of the communication action for the next frame, both of which include the bit length of BSS.

For example, assuming now that the frame length is 9 bytes, and time of a single mini-slot is equivalent to 16 bits on the data length basis. The first set value in this case is set to "90", since transmission of 1-byte data needs 10 bits, including 2-bit BSS. The second set value is set to "122" (0.90+16× 2), since it is necessary to ensure time equivalent to two mini-slots for waiting the signal pattern DTS which indicates the end of frame transmission, and the next frame. Accordingly, the transmission period judgment section 125 turns the signal SB to "H" level if the count value CNT from the counter 124 is not larger than 90, and turns the signal SB to "L" level if the count value CNT is larger than 90. The transmission period judgment section 125 also outputs the reset signal RST, if the count value CNT reaches 122.

In the signal processing section illustrated in FIG. 7, the AND circuit 123 in the transmission period detection section 120 accepts inputs of the FSS detection signal FSSD and the enable signal EN, and outputs a result of calculation to the counter 124.

As has been described in the above, according to the first embodiment, upon detection of eleven or more consecutive bits of "H" level in the received signal, generated due to noise contamination or the like during communication of the dynamic frame, the signal processing section SA masks all of the eleventh and succeeding bit(s) of "H" level so as to turn them into "L" level, and then outputs them to the communication controller 4. In other words, whatever event possibly triggering malfunctions is masked. In this way, a plurality of frames may be reduced from being transmitted simultaneously, the next dynamic frame may be reduced from being incorrectly timed for transmission, and thereby the succeeding dynamic frames may correctly be communicated.

Second Embodiment

Next, a second embodiment will be explained.

In the second embodiment explained hereinafter, if eleven or more consecutive bits of "H" level are detected during communication of the dynamic frame, the received signal is masked to produce "L" level up to the end of the dynamic frame, and the received signal is then output to the communication controller. In this way, the dynamic frame currently in process (in the process of reception) might err, but the next dynamic frame may be reduced from being incorrectly timed for transmission, by avoiding that the individual nodes are brought into the IDEL wait state during the communication, and thereby the next dynamic frame may correctly be communicated.

Overall configuration of the communication system of the second embodiment is similar to that in the first embodiment, and will not repetitively be explained. The paragraphs below explain the signal processing section in the second embodiment.

Figure 8:
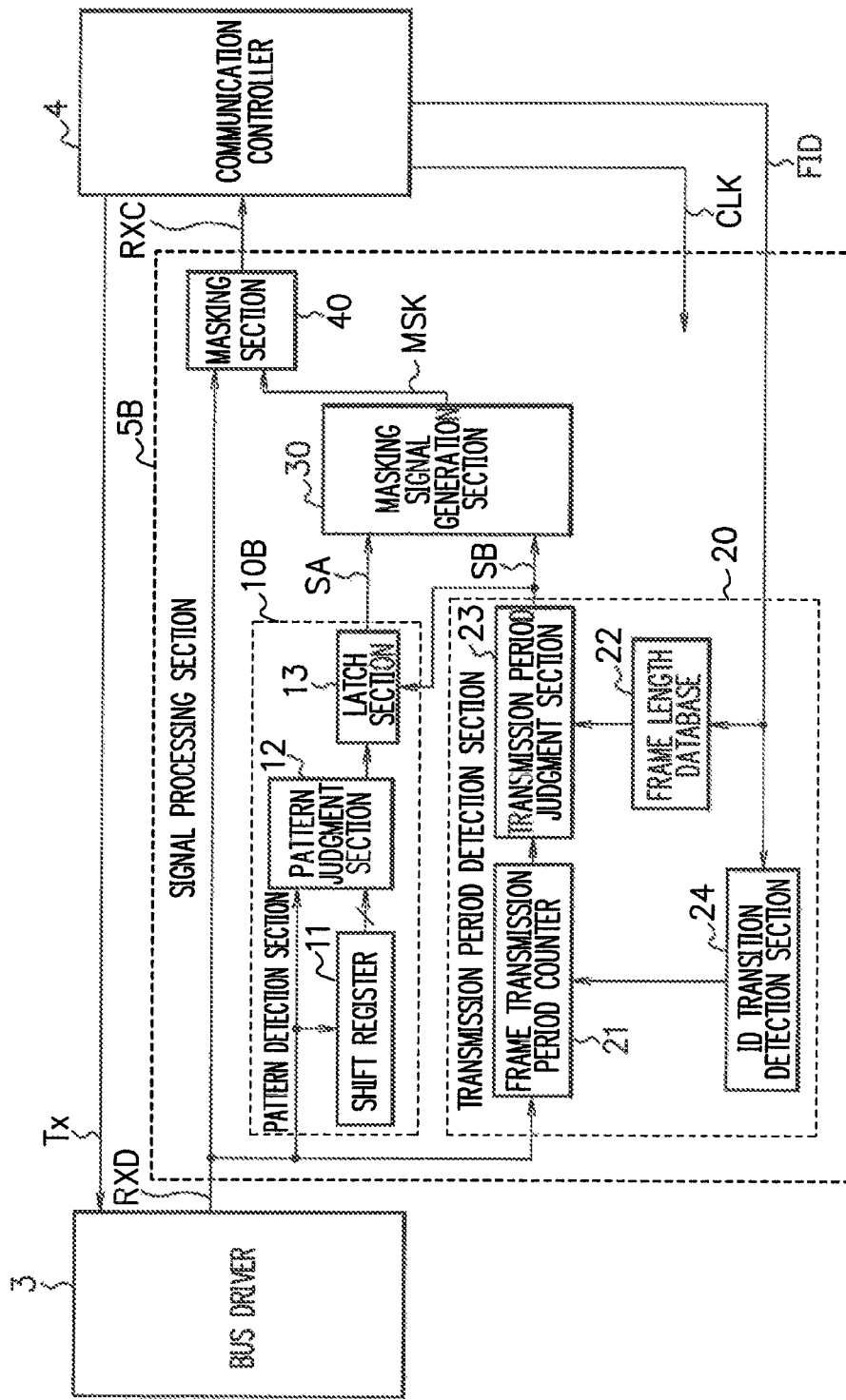
FIG. 8 is a drawing illustrating an exemplary configuration of a signal processing section of a second embodiment.

FIG. 8 is a block diagram illustrating an exemplary configuration of the signal processing section 5B in the second embodiment. In FIG. 8, all constituents having functions identical to those illustrated in FIG. 2 will be given the same reference numerals or symbols, and relevant explanations will not be repeated. The signal processing section 5B in the second embodiment has a pattern detection section 10B, the transmission period detection section 20, the masking signal generation section 30, and the masking section 40, and operates according to the operation clock CLK.

The pattern detection section 10B has a latch section 13, besides the shift register 11 and the pattern judgment section 12. Upon receiving an output (result of judgment) of the pattern judgment section 12, the latch section 13 holds the output, and outputs it as the signal SA. The latch section 13 is reset by the signal SB. For example, the latch section 13 holds the output of the pattern judgment section 12 over the period in which the communication of the dynamic frame persists, and clears the held information upon completion of the communication of the dynamic frame.

Figure 9:
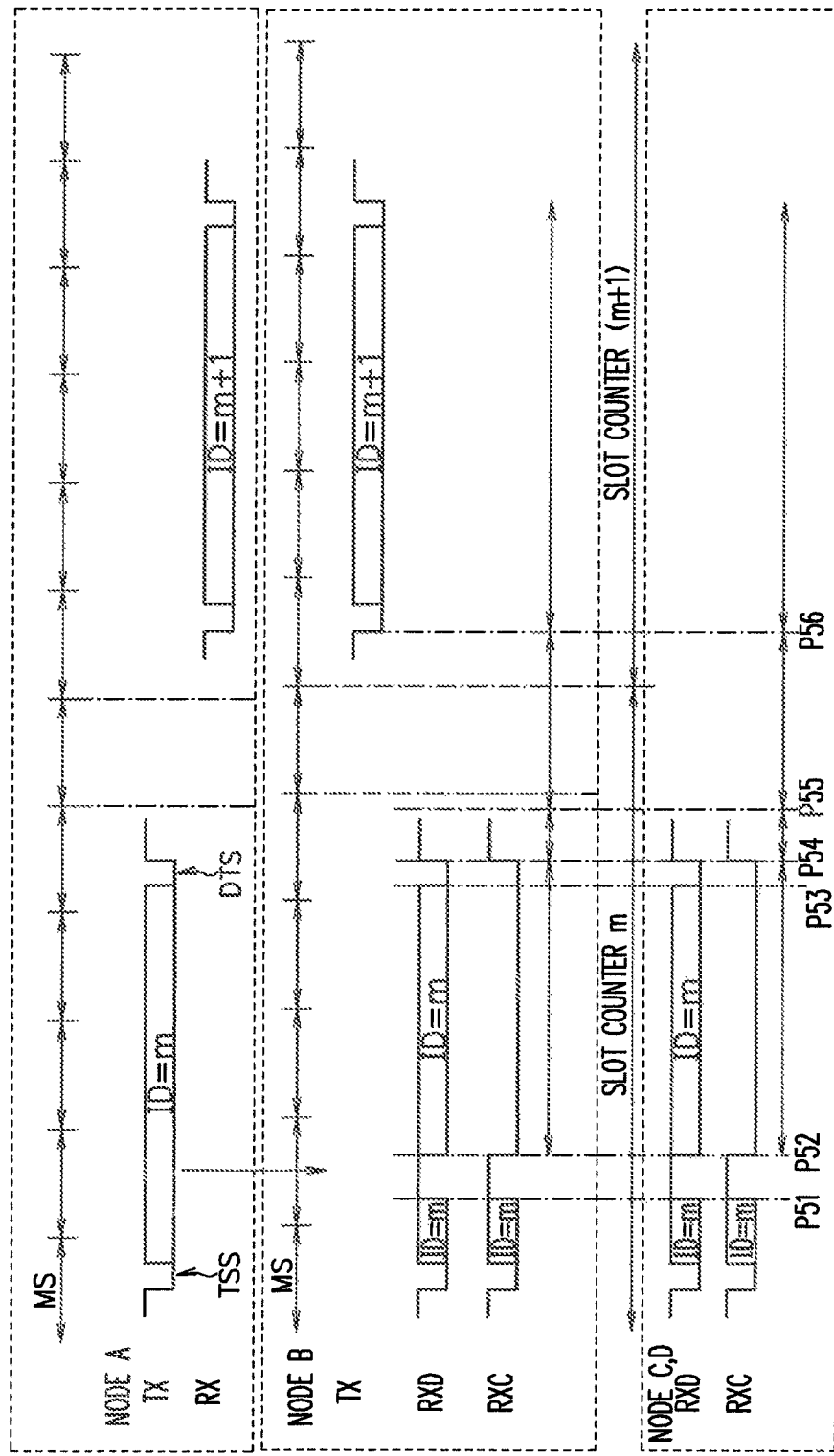
FIG. 9 is a drawing explaining operations of the signal processing section illustrated in FIG. 8.

The signal processing section 5B in the second embodiment operates as illustrated in FIG. 9. If eleven or more consecutive bits of "H" level ("H" level over the period from P51 to P52) are induced by noise at nodes B, C and D on the receiving side, during transmission of the dynamic frame (ID=m) by node A, the pattern detection section 10B in the signal processing section 5B at the nodes on the receiving side detects the signal pattern. On the other hand, the transmission period detection section 20 in the signal processing section 5B at the nodes on the receiving side is now detecting that the period is currently used for communication of the dynamic frame (ID=m).

As a consequence, the masking signal generation section 30 outputs the masking signal MSK over a period from the time when eleven or more consecutive bits of "H" level ware detected to the end of frame, so as to mask the received signal RXD to turn it to "L" level, that is, so as to produce a signal pattern which indicates start of frame transmission.

Accordingly, in the second embodiment, if eleven or more consecutive bits of "H" level are detected in the received signal RXD, the masking section 40 masks the received signal RXD so as to have "L" level, and outputs it as the received signal RXC to the communication controller 4, over the period from the time of detection to the end of frame (P53). Nodes B, C and D in this process complete reception of the frame having been transmitted by node A, and are brought into the wait state for reception of frame.

Upon completion of communication of the dynamic frame (ID=m) (P54), the signal processing sections 5B of nodes B, C and D output the received signal RXD as the received signal RXC to the communication controller 4, without masking the received signal RXD. Nodes B, C and D herein are once brought into the IDLE wait state by the "H" level received immediately after the end of the dynamic frame (ID=m), but cause transition from the IDLE wait state to the IDLE state, due to eleven or more consecutive bits of "H" (P55). The value of the slot counter is incremented, the right to transmit the dynamic frame is shifted, and communication of the next dynamic frame (ID=m+1) starts (P56).

In this way, even if eleven or more consecutive bits of "H" level generate at the nodes on the receiving side during the communication of the dynamic frame (ID=m), the succeeding state transition is reduced from being incorrectly timed, enough to allow the communication action for the next dynamic frame (ID=m+1) to correctly proceed.

Figure 10:
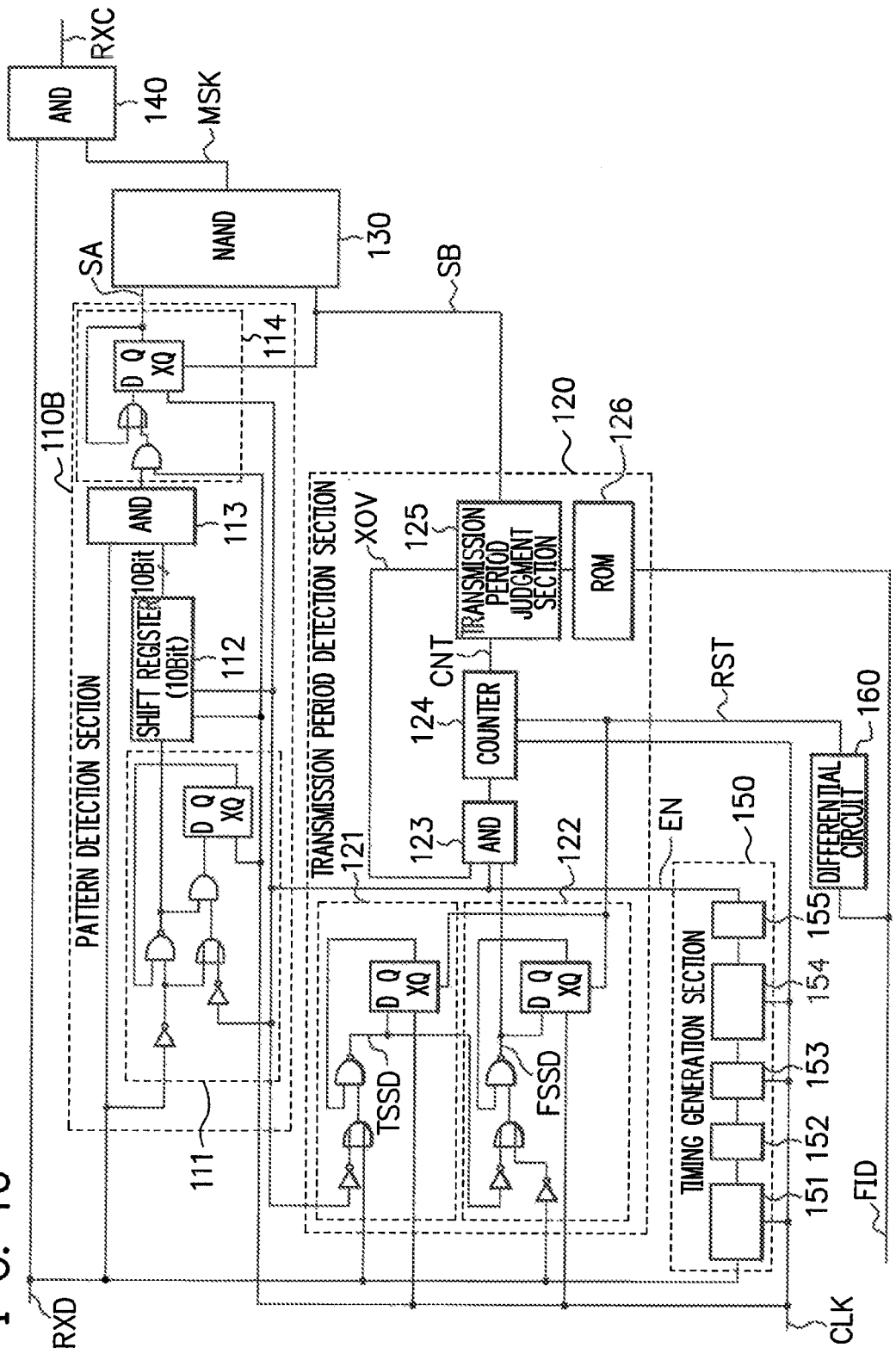
FIG. 10 is a drawing illustrating an exemplary circuit configuration of the signal processing section of the second embodiment.

FIG. 10 is a drawing illustrating an exemplary circuit configuration of the signal processing section 5B in the second embodiment. In FIG. 10, all constituents having functions identical to those illustrated in FIG. 4 will be given the same reference numerals or symbols, and relevant explanations will not be repeated.

The signal processing section in the second embodiment illustrated in FIG. 10 is different from the signal processing section in the first embodiment illustrated in FIG. 4, in the configuration of the pattern detection section.

The pattern detection section 110B illustrated in FIG. 10 corresponds to the pattern detection section 10B illustrated in FIG. 8, and detects the first signal pattern composed of eleven consecutive bits of "H" level, by which the end of communication of the dynamic frame is recognized from the received signal RXD. The pattern detection section 110B has a latch circuit 114, besides the masking circuit 111, the shift register 112, and the AND circuit 113.

The latch circuit 114 corresponds to the latch section 13 illustrated in FIG. 8, and latches an output of the AND circuit 113. The latch circuit 114 has an AND circuit, an OR circuit, and a flip-flop which operates based on the operation clock CLK, and is reset by the signal SB.

An output of the AND circuit 113 and the operation clock CLK are input to the AND circuit. An output of the AND circuit and an output Q of the flip-flop are input to the OR circuit, and an output of the OR circuit is input to the flip-flop. The output of the flip-flop is output as the signal SA.

Figure 12:
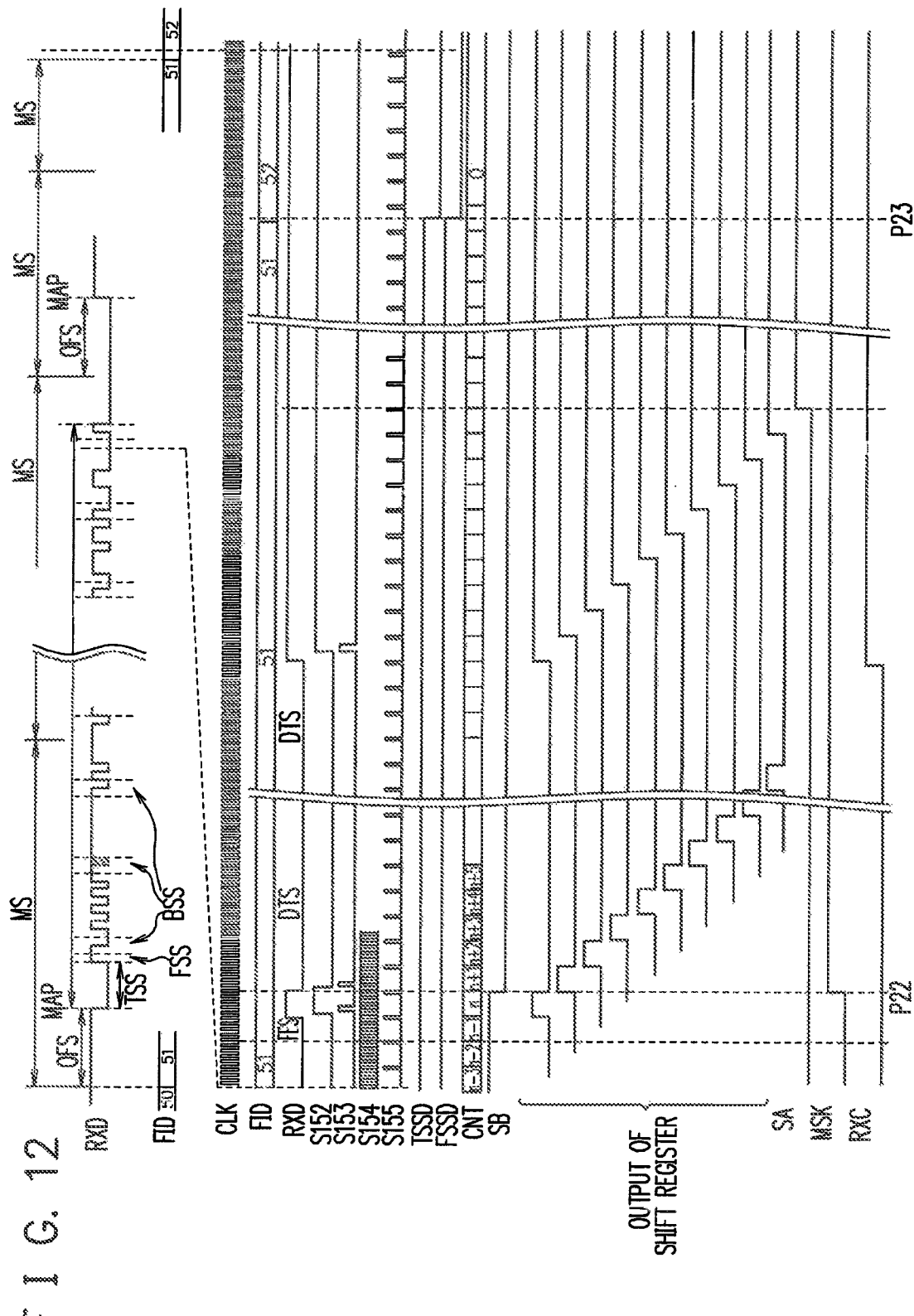
FIG. 12 is a timing chart illustrating operations of the signal processing section illustrated in FIG. 10.
Figure 14:
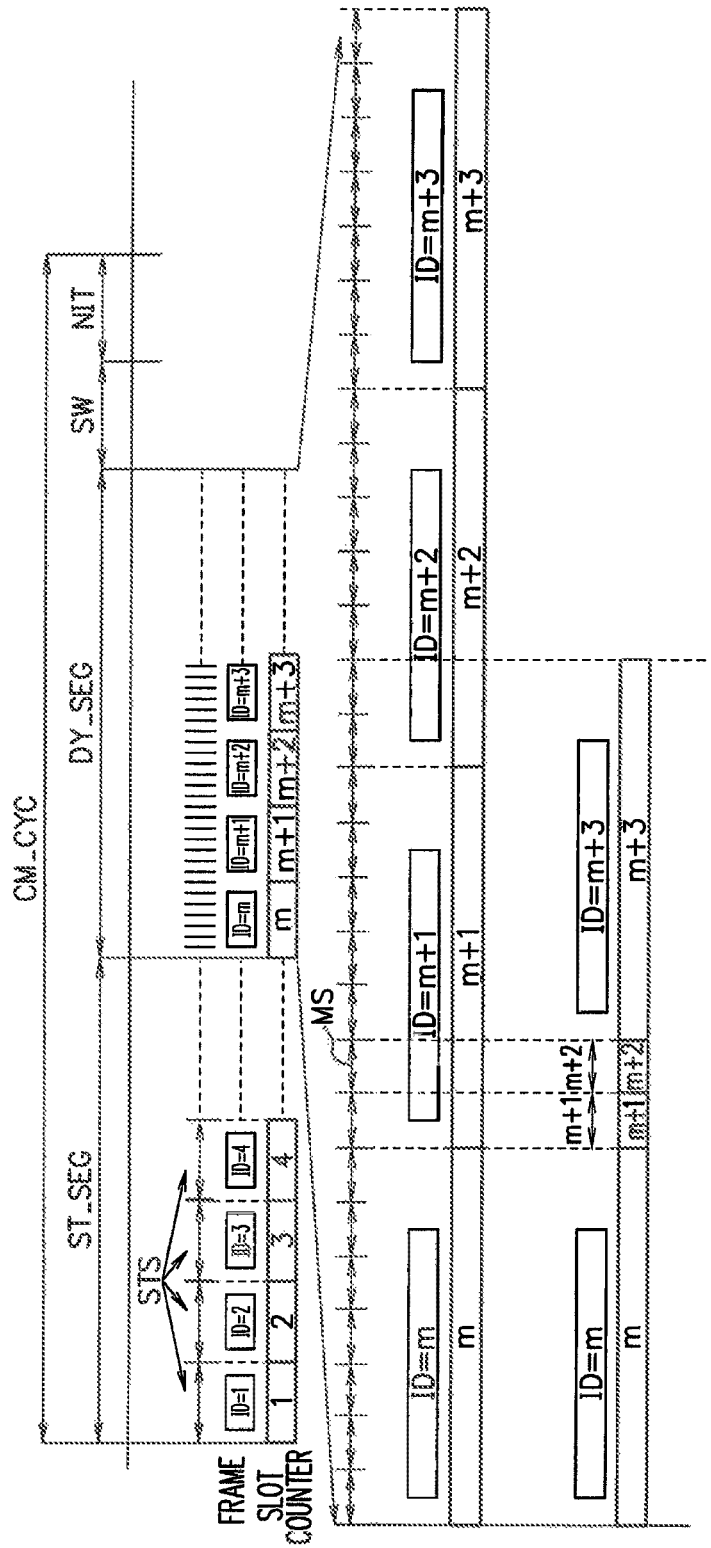
FIG. 14 is a drawing explaining the FlexRay protocol communication.
Figure 15:
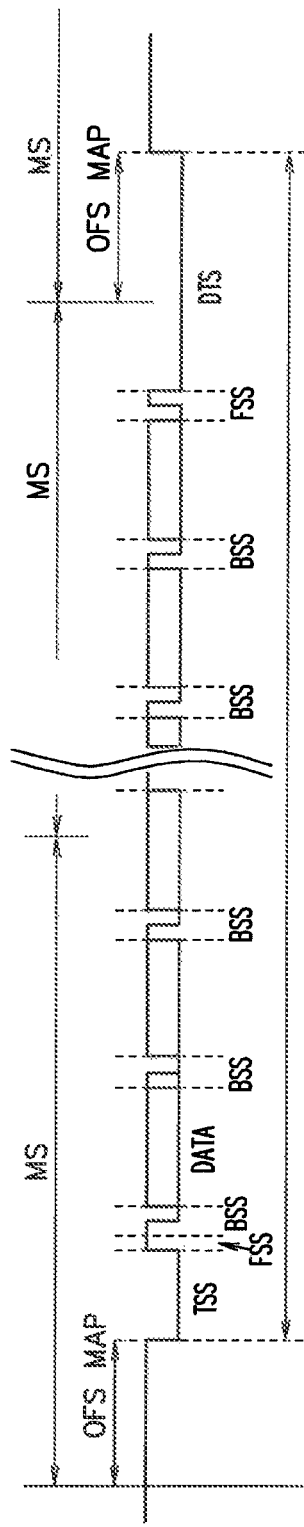
FIG. 15 is a drawing illustrating transmission timing of dynamic frame.

FIG. 11 and FIG. 12 are timing charts illustrating operations of the signal processing section illustrated in FIG. 10. FIG. 11 illustrates operations of signal processing section, in particular those at the start of masking of the received signal RXD, and FIG. 12 illustrates operations of the signal processing section, in particular those at the end of communication of the dynamic frame.

In FIG. 11 and FIG. 12, RXD, FID and CLK respectively represent the received signal, the frame ID, and the operation clock which are input to the signal processing section, and RXC represents the received signal output from the signal processing section. S152, S153, S154 and EN respectively represent outputs of the individual functional sections 152, 153, 154 and 155 in the timing generation section 150. TSSD, FSSD, CNT and SB respectively represent outputs of the individual functional sections 121, 122, 124 and 125 in the transmission period detection section 120. SA represents an output of the pattern detection section 110B, and MSK represents a masking signal which is an output of the NAND circuit 130.

As illustrated in FIG. 11, during the period in which the masking signal MSK is kept at "H" level, the received signal RXD is output as the received signal RXC without modification. In contrast, if the received signal RXD and all of the outputs of the shift register 112 have "H" level, in other words, if eleven consecutive bits of "H" level are detected so as to turn the signal SA to "H" level, during the period of communication of the dynamic frame (during the period in which the signal SB is kept at "H" level), the masking signal MSK turns to "L" level (P21). In this way, the received signal RXD is masked by the masking signal MSK, so that the received signal RXC is output at "L" level, irrespective of the received signal RXD. The masking signal MSK once set to "L" level keeps the "L" level up to the end of frame (P22 in FIG. 12).

In addition, as illustrated in FIG. 12, at the end of frame, if the count value CNT output from the counter 124 is larger than a set value n (preliminarily-set frame length), the signal SB turns to "L" level (P22). In association therewith, the masking signal MSK turns to "H" level, and the received signal RXD is output as the received signal RXC.

After the "L"-level signal pattern DTS, which indicates the end of frame transmission, is input as the received signal RXD over a certain period, the received signal RXD turns to "H" level. Thereafter, upon transition of the frame ID, the signals TSSD, FSSD and the counter value CNT are initialized, and the process advances to the communication action for the next frame (P23).

In the above-described second embodiment, if the frame length of the dynamic frame is fixed, operations for detecting whether the period is currently used for communication of the dynamic frame or not may alternatively be embodied by a configuration similar to that illustrated in FIG. 7.

FIG. 13 is a drawing illustrating another exemplary circuit configuration of the signal processing section 5B in the second embodiment. In FIG. 13, all constituents having functions identical to those illustrated in FIG. 7 and FIG. 10 will be given the same reference numerals or symbols, and relevant explanations will not be repeated.

The signal processing section illustrated in FIG. 13 is provided with an inverter 170 which inverts the signal SA output from the pattern detection section 110B and outputs it to the AND circuit 140, in place of the NAND circuit 130. Also according to the configuration, the received signal may be masked to have "L" level over the period from the time when eleven consecutive bits of "H" level are detected during communication of the dynamic frame up to the end of frame.

As has been described in the above, according to the second embodiment, upon detection of eleven or more consecutive bits of "H" level in the received signal, generated due to noise contamination or the like during communication of the dynamic frame, the signal processing section 5B masks all of the received signals so as to turn them into "L" level, and then outputs them to the communication controller 4. In other words, whatever signal changes causative of inducing malfunctions are masked. In this way, a plurality of frames may be reduced from being transmitted simultaneously, the next dynamic frame may be reduced from being incorrectly timed for transmission, and thereby the succeeding dynamic frames may correctly be communicated.

According to the above-mentioned embodiment, startup of communication action for the next frame is halted until the period being currently used for communication of a frame comes to the end, even if the signal pattern, by which the end of communication of the frame is recognized, is detected in the received signal of the frame currently in process. Accordingly, transmission of frames from a plurality of communication devices may be avoidable simultaneously.

The embodiments in the above have been described merely for the purpose of exemplifying the present invention, by which the technical scope of the present invention is by no means limitedly interpreted. In other words, the present invention may be embodied in various ways, without departing from the technical idea and essential features thereof.

According to the present embodiment, when the signal pattern by which the end of communication of the frame may be recognized is detected in the received signal of the frame currently in process, startup of communication action for the next frame is halted until the period being currently used for communication of a frame comes to the end. In this way, a plurality of frames may be reduced from being transmitted simultaneously, even if the signal pattern by which the end of communication of frame may be recognized is detected during communication of the frame, and thereby the next frame may correctly be communicated, while avoiding any malfunction due to abnormal received signal in the frame currently in process.

All examples and conditional language recited herein are intended for pedagogical. purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A signal processor configured to allow a communication device to recognize the end of communication of a frame, based on a received signal, and to start a communication action of a next frame, the signal processor comprising:
a controller configured to halt a beginning of the communication action of the next frame;
an output processing section configured to instruct the controller to halt the beginning of the communication action of the next frame, upon detection of a first signal pattern in a period currently being used for communication of the frame, and until the period currently being used for communication of the frame ends, and
wherein the output processing section is further configured to output the received signal to the controller.

2. The signal processor according to claim 1 further comprising a period detection section configured to detect the period currently being used.

3. The signal processor according to claim 2, wherein the period detection section comprises:
a counter section configured to count a received data volume summed up from the start of transmission of the frame; and
a period judgment section configured to compare the received data volume obtained by the counter section and a preliminarily set frame length, and to judge whether the period is currently used for communication of the frame or not.

4. The signal processor according to claim 3, wherein the counter section comprises:
a detection section configured to detect a start of the frame based on the received signal; and
a counter configured to count a number of sampling pulses used for acquiring data from the received signal, upon detection of the start of the frame by the detection section.

5. The signal processor according to claim 1 further comprising a pattern detection section configured to detect the first signal pattern from the received signal.

6. The signal processor according to claim 5, wherein the output processing is further configured to mask the received signal so as to produce a second signal pattern indicating the startup of a transmission of the frame, upon detection of the first signal pattern by the pattern detection section.

7. The signal processor according to claim 5, wherein the signal processor is configured to recognize an end of communication of the frame using the first signal pattern.

8. The signal processor according to claim 5, wherein the output processing section outputs the received signal to the controller upon detection of the first signal pattern by the pattern detection section, in the period currently being used for communication of the frame and after masking the first signal pattern.

9. The signal processor according to claim 8, wherein the output processing section further comprises:
- a masking signal generation section configured to generate a masking signal upon detection of the first signal pattern by the pattern detection section in the period currently being used for communication of the frame; and
- a masking section configured to mask the received signal to be output to the controller.

10. The signal processor according to claim 8, the masking signal corresponds to an output of the masking signal generation section.

11. The signal processor according to claim 5, wherein the output processing section inverts, upon detection of the signal pattern by the pattern detection section in the period currently being used for communication of the frame, the level of the n-th and succeeding bit in the first signal pattern detected from the received signal.

12. The signal processor according to claim 11, wherein the period detection section further comprises a storage section that preliminarily stores a frame length of the frame to be communicated, and the period detection section is further configured to supply the frame length of the frame currently in process to the period judgment section.

13. The signal processor according to claim 5, comprising a holding section holding a result of detection by the pattern detection section over the period currently being used for communication of the frame.

14. The signal processor according to claim 1, wherein the controller is coupled to the output processing section.

15. The signal processor according to claim 1, wherein the signal pattern comprises n consecutive bits of similar logic level, wherein n is a natural number greater than or equal to 2.

16. The signal processor according to claim 1, wherein the first signal pattern comprises n consecutive bits of similar logical level, and wherein n is a natural number greater than or equal to 2.

17. A communication device allowing frame communication to proceed based on allocated unit communication periods, so as to start a communication action of a next frame upon recognition of the end of communication of a frame based on a received signal, the communication device comprising:
- a transmitter-receiver section configured to transmit or receive signals between other communication devices and the communication device;
- a controller section configured to control signals transmitted or received by the transmitter-receiver section; and
- an output processing section configured to instruct the controller to halt a startup of communication action of the next frame upon detection of the first signal pattern by the pattern detection section in the period currently being used for communication of the frame and until the period currently being used for communication of the frame ends, and wherein the output processing section is further configured to output the received signal to the controller.

\* \* \* \* \*